US006763071B1

(12) United States Patent
Maeda et al.

(10) Patent No.: US 6,763,071 B1
(45) Date of Patent: Jul. 13, 2004

(54) IMAGE PROCESSING APPARATUS, METHOD THEREFOR AND RECORDING MEDIUM STORING IMAGE PROCESSING PROGRAM

(75) Inventors: Mitsuru Maeda, Tokyo (JP); Hiroshi Inoue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,185

(22) Filed: Dec. 2, 1999

(30) Foreign Application Priority Data

Dec. 4, 1998 (JP) .......................................... 10-345447
Apr. 27, 1999 (JP) .......................................... 11-119621

(51) Int. Cl.[7] ............................ H04B 1/66; H04N 7/00; G06K 9/46
(52) U.S. Cl. .................... 375/240.25; 382/232; 348/465
(58) Field of Search ....................... 375/240.13, 240.15, 375/240.16, 240.28, 240.25; 348/415.1, 460, 462, 465; 382/100, 135, 232

(56) References Cited

U.S. PATENT DOCUMENTS

| 4,974,071 A | | 11/1990 | Maeda ........................ 358/80 |
|---|---|---|---|
| 5,359,438 A | | 10/1994 | Maeda ........................ 358/539 |
| 5,371,606 A | | 12/1994 | Katayama et al. .......... 358/400 |
| 5,521,717 A | | 5/1996 | Maeda ........................ 358/426 |
| 5,621,794 A | * | 4/1997 | Matsuda et al. .......... 348/415.1 |
| 5,805,700 A | | 9/1998 | Nardone et al. .............. 380/10 |
| 5,933,249 A | | 8/1999 | Shimura et al. ............. 358/429 |
| 6,343,138 B1 | * | 1/2002 | Rhoads ........................ 382/100 |
| 6,411,725 B1 | * | 6/2002 | Rhoads ........................ 382/100 |
| 6,415,042 B1 | * | 7/2002 | Shin ............................ 382/100 |
| 2002/0010859 A1 | * | 1/2002 | Maeda ........................ 713/176 |

FOREIGN PATENT DOCUMENTS

| EP | 0763936 | 9/1996 | .......... H04N/5/913 |
|---|---|---|---|
| EP | 0794487 | 3/1997 | ............. G06F/9/30 |
| EP | 924930 | 6/1999 | |
| EP | 0969668 | 1/2000 | ............ H04N/7/24 |
| EP | 1006726 | 6/2000 | ............ H04N/7/24 |
| EP | 1006728 | 6/2000 | ............ H04N/7/24 |
| JP | 8-163533 A | 6/1996 | |
| WO | 9948296 | 9/1999 | .......... H04N/7/167 |

OTHER PUBLICATIONS

"N2323–MPEG–4 Overview—(Dublin version)", International Organization For Standardization—Organisation Internationale De Normalisation, Jul. 1998, pp. 1–55.

Hill et al., "MPEG–4 IPR Protection Requirements Specifications", Acts Project AC302—Mirador, Jul. 1998, 50 sheets.

Casalino F. et al., "MPEG–4 systems, concepts and implementation" Lecture Notes in Computer Science, Springer Verlag, New York, NY, US, May 1998, pp. 504–517.

* cited by examiner

*Primary Examiner*—Gims Philippe
(74) *Attorney, Agent, or Firm*—Fitzpatrick, Cella, Harper & Scinto

(57) ABSTRACT

There is provided an image processing apparatus for entering image data encoded with plural encoding modes and security data for protecting the image data, discriminating, based on the security data, whether the reproduction of the encoded image data is permitted, judging the encoding mode of the encoded image data, and decoding the encoded image data according to the results of discrimination and judgment, a method therefor and a recording medium storing the corresponding image processing program.

54 Claims, 22 Drawing Sheets

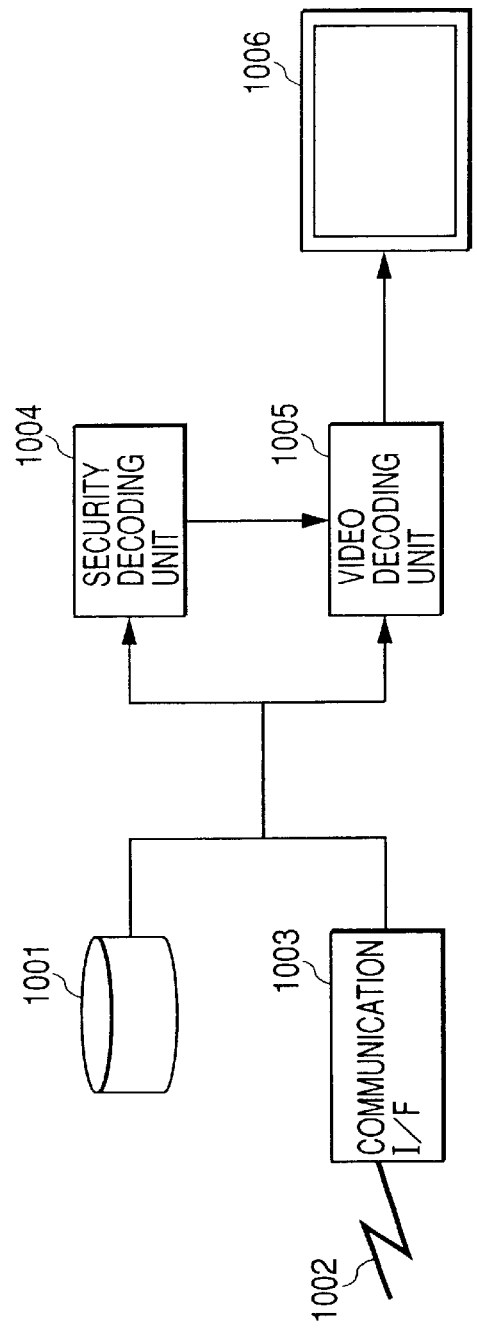

FIG. 24

| CodeLength | Objectcode | IPcode | SecurityStartTime | SecurityEndTime | ... |
|---|---|---|---|---|---|
| 4011 | 4030 | 4012 | 4013 | 4014 | |

FIG. 25

| CodeLength | IPcode | SecurityStartTime | ... |
|---|---|---|---|
| 2011 | 2012 | 2013 | |

IMAGE PROCESSING APPARATUS, METHOD THEREFOR AND RECORDING MEDIUM STORING IMAGE PROCESSING PROGRAM

BACKGROUND OF THE INVENTION

1. Field of the Invention

The present invention relates to image processing for protecting the copyright of the image or the like.

2. Related Background Art

Standardization of motion image encoding technology is progressing rapidly in recent years. There are already determined encoding standards such as MPEG-1, 2, H.261 and H.263 (these encoding methods being internationally standardized by ISO (International Organization for Standardization) and ITU (International Telecommunication Union)), and international standardization is being in progress for MPEG-4 as the general-purpose next-generation multi media encoding standard usable in various areas such as computer, broadcasting and communication. These encoding technologies have advanced the digitization of images, stimulating rapid progress in the accumulation and communication of motion image data.

For example in the MPEG-4, a motion image scene of a given instant is regarded as a group of constituent objects such as "person", "automobile", "background", "music", "video" etc., and highly efficient encoding of the motion image data is achieved by applying adaptive encoding for each object.

In the multi-object encoding technology such as MPEG-4, a scene is represented by the combination of compression encoded objects. Consequently another scene can be easily represented in the MPEG-4 data, by re-utilizing object data from other MPEG-4 data.

With the spreading of such digital encoding standards as mentioned above, the issue of copyright protection is being strongly requested from the contents-related businesses. The issue is that good contents cannot be safely provided with the standard that cannot ensure satisfactory copyright protection.

This issue is serious in MPEG-4, because the encoding is executed for each object in MPEG-4 as explained above and can therefore be manipulated or modified. Consequently, in the multi-object encoding as in MPEG-4, the protection of intellectual property in the unit of each object is an obvious request in consideration of smooth re-utilization of each object, and the protection of portrait right is also requested in case the object is a person.

Therefore, for the purpose of protecting the copyright of a part of a motion image, there is conceived a method of temporarily stopping the decoding of the motion image in order not to reproduce such part of the motion image. More specifically, in consideration of the copyright or portrait right in the motion image, the decoding is stopped in a portion relating to such rights, and is started again after such portion is over.

Such method is however associated with the following drawbacks.

For the motion image, there is generally employed encoding methods utilizing interframe correlation. Among these methods, well known are H.261, H.263, MPEG-1, 2 and MPEG-4. In these methods, the encoding is basically executed by motion compensation, referring to a preceding frame or preceding and succeeding frames in time.

FIG. 1 shows the mode of reproduction by H.261, H.263 etc., in which I indicates a frame for which inframe encoding is executed while P indicates a frame for which interframe encoding is executed. In FIG. 1, TIME indicates lapse of time; SECURITY shows the period (black zone) during which the decoding is stopped; CODE indicates the arrangement of frames in the order of encoding; and DISPLAY indicates the arrangement of frames in the order of display.

It is now assumed that the decoding is stopped for the encoded data $P_4$ to $P_9$ for the purpose of protection (security) of the intellectual property right (for example copyright). The decoding of the motion image is stopped at $P_3$, and the image is thereafter not displayed until the decoding is re-started. Simultaneous with the stopping of the decoding, the writing of the encoded data into the buffer is stopped, so that the encoded data $P_4$ to $P_9$ are discarded. Therefore, when the decoding is re-started from $P_{10}$ after the image protection period, the decoding process from $P_{10}$ cannot be executed properly since $P_9$, to be referred to by $P_{10}$, is already discarded, so that the image in each frame is perturbed or the decoding operation is interrupted in a period of $P_{10}$ to $P_{13}$ before the decoding of the intraframe encoded $I_1$.

Also, the MPEG-1, 2 or 4 encoding method employs bidirectional motion compensation executing prediction forward and backward in time.

FIG. 2 shows the encoding mode in such method. B indicates a frame for which bidirectional interframe encoding is executed. In FIG. 2, TIME indicates lapse of time; SECURITY shows the period (black zone) during which the decoding is stopped; CODE indicates the arrangement of frames in the order of encoding; and DISPLAY indicates the arrangement of frames in the order of display. The order of encoding of frames becomes different from that of original image due to the presence of B frames.

It is now assumed that the decoding is stopped for the encoded data $B_{10}$ to $P_3$ for the purpose of protection of the intellectual property right (for example copyright). Since motion compensation is not properly executed as in the case of FIG. 1, the images of the frames $B_{30}$, $B_{31}$, $B_{40}$ or $B_{41}$ cannot be properly executed, so that there may result perturbation of the image in each frame or interruption of the decoding operation.

SUMMARY OF THE INVENTION

In consideration of the foregoing, an object of the present invention is to provide an image processing apparatus capable of adequately processing reproduction/stopping of the image for protecting the intellectual property right (for example copyright) of the image, a method therefor and a recording medium storing an image processing program.

The above-mentioned object can be attained, according to a preferred embodiment, by an image processing apparatus/method which comprises entering image data encoded with plural encoding modes and security data for protecting the image data; discriminating, based on the security data, whether the reproduction of the encoded image data is permitted; judging the encoding mode of the encoded image data; and decoding the encoded image data based on the results of discrimination and judgment.

Also according to another preferred embodiment, there is provided an image processing apparatus/method which comprises entering image data encoded with plural encoding modes and security data for protecting the image data; discriminating, based on the security data, whether the reproduction of the encoded image data is permitted; judging the encoding mode of the encoded image data; decoding the encoded image data; and controlling the synchronization of the decoded image data based on the result of discrimination and the result of encoding mode judgment.

Also according to still another preferred embodiment, there is provided a recording medium storing process codes of an image processing method, which comprises an input step of entering image data encoded with plural encoding modes and security data for protecting the image data; a discrimination step of discriminating, based on the security data, whether the reproduction of the encoded image data is permitted; an encoding mode judging step of judging the encoding mode of the encoded image data; a decoding step of decoding the encoded image data and outputting the decoded image data; and a decoding step of decoding the encoded image based on the result of discrimination of the discrimination step and the result of judgment of the encoding mode judgment step.

Also according to still another preferred embodiment, there is provided a recording medium storing process codes of an image processing method, which comprises an input step of entering image data encoded with plural encoding modes and security data for protecting the image data; a discrimination step of discriminating, based on the security data, whether the reproduction of the encoded image data is permitted; an encoding mode judging step of judging the encoding mode of the encoded image data; an image decoding step of decoding the encoded image data; and a synchronization control step of controlling synchronization of the decoded image data based on the result of discrimination and the result of judgment of the encoding mode.

Other objects, features and advantages of the invention will become fully apparent from the following detailed description taken in conjunction with the accompanying drawings.

BRIEF DESCRIPTION OF THE DRAWINGS

FIG. 3 is a block diagram showing the configuration of an image processing apparatus constituting a first embodiment of the present invention;

FIG. 4 is a view showing the security encoded data in the first embodiment of the present invention;

FIG. 13 is a view showing the security encoded data in the third embodiment;

FIG. 24 is a view showing the security encoded data of another configuration in the fourth embodiment;

FIG. 25 is a view showing the security encoded data of still another configuration in the fourth embodiment;

DETAILED DESCRIPTION OF THE PREFERRED EMBODIMENTS

Figure 1:
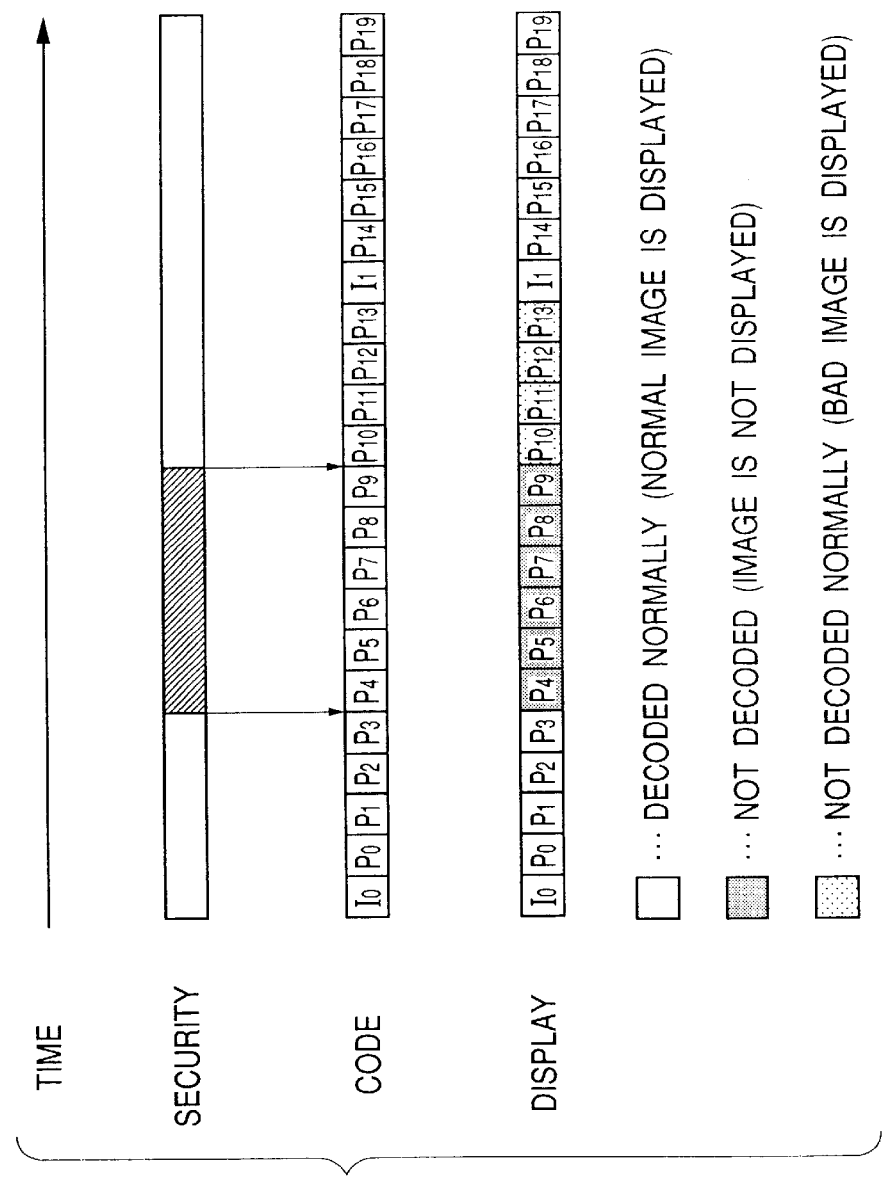
FIG. 1 is a view showing the mode of conventional decoding in case of protection of an image (composed of I, P frames)
Figure 2:
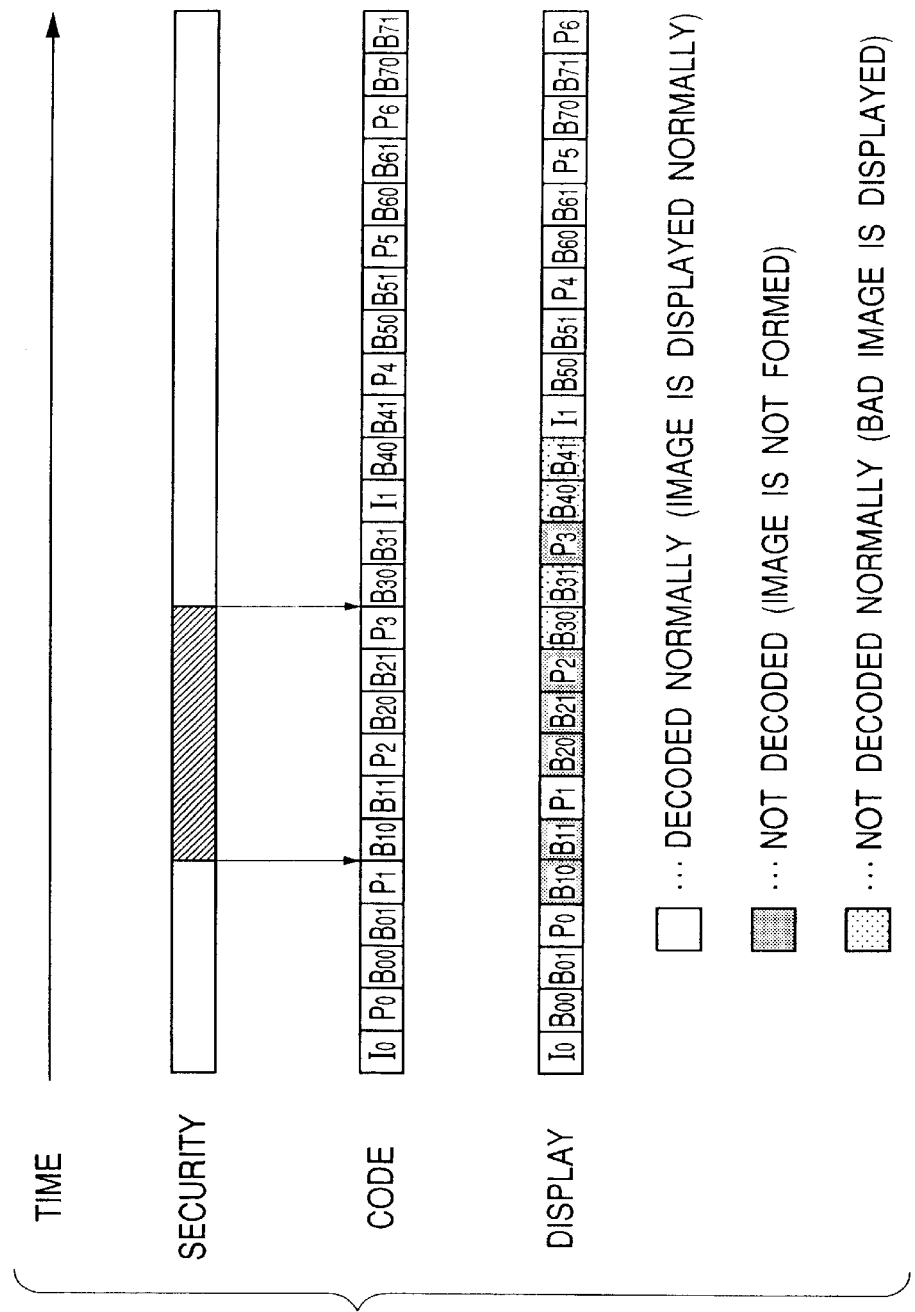
FIG. 2 is a view showing the mode of conventional decoding in case of protection of an image (composed of I, P, B frames)

In the following there will be given a detailed description on a first embodiment of the present invention, with reference to the accompanying drawings.

FIG. 3 is a block diagram showing the configuration of an image processing apparatus, constituting the first embodiment of the present invention.

Referring to FIG. 3, a memory device 1001 stores motion image data, which are composed of encoded data of each motion image, and security encoded data in which information for protecting the copyright is encoded. In the present embodiment, it is assumed that the security encoded data are transmitted prior to the transmission of the motion image data. However, such method is not restrictive, and the security encoded data may be transmitted by time-shared multiplexing with the motion image data.

In the present embodiment, there will be explained a case where the motion image encoded data are encoded by the MPEG-1 encoding method. The MPEG-1 encoding method is detailedly described in ISO/IEC 11172-2 and will not, therefore, be explained further. For the purpose of brevity, it is assumed that the encoding is executed in the unit of a frame, and the data consist of I frames in which inframe encoding is conducted and P frames utilizing interframe correlation. For the motion image data, there may be employed any encoding method utilizing frames of intraframe encoding and interframe correlation. Naturally there may be employed encoding in the unit of a field.

FIG. 4 shows the configuration of the security encoded data.

Referring to FIG. 4, there are shown a code length code 2001 indicating the code length of the security encoded data; an IP code 2002 indicating the information required for certification of the intellectual property right (copyright being taken as example in the present embodiment); a security start time code 2003 indicating the time for starting the copyright protection; and a security end time code 2004 indicating the time for releasing the copyright protection. In the present embodiment, data 2002 to 2004 can designate one portion to be secured in the motion image data. Therefore, if plural portions to be secured are present in divided manner, plural sets of data 2002 to 2004 are present consecutively, corresponding to such plural portions (cf. FIG. 4).

Again referring to FIG. 3, a communication circuit 1002 is composed of a LAN, a public communication line, a wireless line or a broadcast wave. A communication interface 1003 receives the motion image data from the communication circuit 1002.

There are also shown a security decoding unit 1004 for decoding the above-mentioned security encoded data and instructing stopping and re-starting of reproduction through comparison with certification data; a video decoding unit 1005 for decoding the motion image encoded data thereby reproducing motion image; and a monitor 1006 for displaying the reproduced motion image.

The processing of the motion image data in the apparatus of the above-described configuration will be explained in the following.

At first an unrepresented operator selects the motion image data to be reproduced, from the memory device 1001. The motion image encoded data and the security encoded data of the selected motion image data are read, and are respectively supplied to the video decoding unit 1005 and the security decoding unit 1004.

Figure 5:
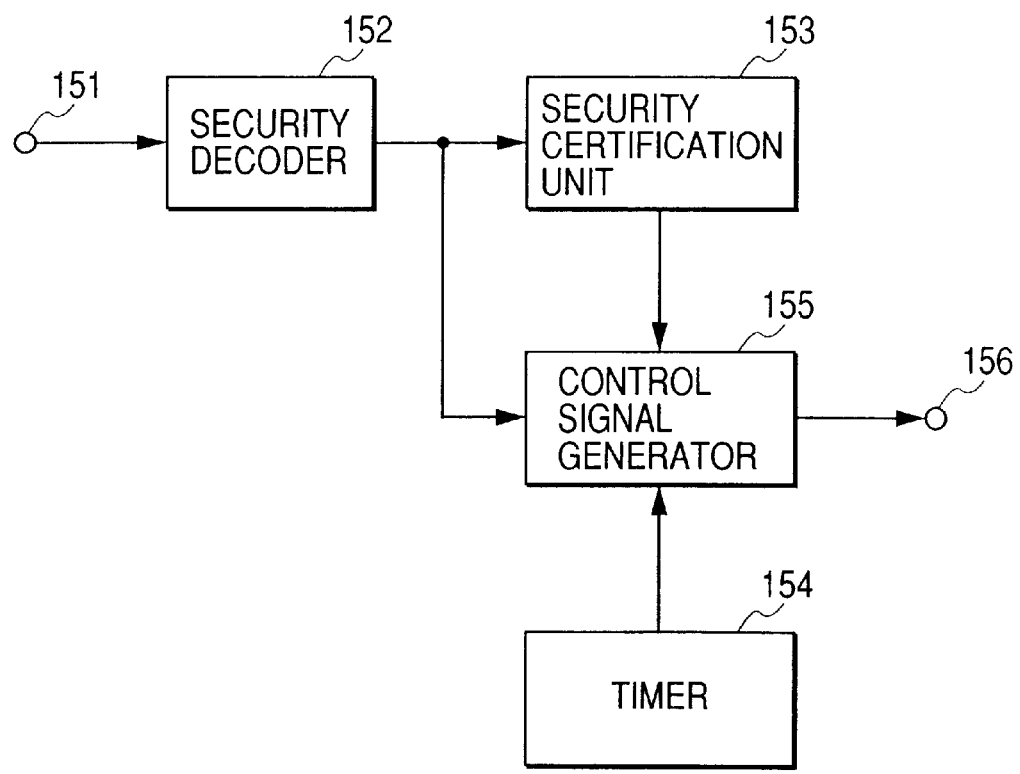
FIG. 5 is a block diagram showing the configuration of a security decoding unit 1004 in the first embodiment.

FIG. 5 is a detailed block diagram of the security decoding unit 1004.

Referring to FIG. 5, there are shown an input terminal 151 for entering the security encoded data; a security decoder 152 for decoding the security encoded data thereby acquiring certification information and information on the time for executing copyright protection; a security certification unit 153 for analyzing the certification information thereby determining whether or not to inhibit decoding; a timer 154 for generating time for properly reproducing the motion image; a control signal generator 155 for generating a signal for controlling the video decoding unit 1005 according to the determination of the security certification unit 153; and an output unit 156 for outputting the control signal, generated by the control signal generator 155 to the video decoding unit 1005.

In the following there will be explained the decoding function of the security decoding unit 1004 of the above-described configuration.

The security encoded data, entered into the input terminal 151, are decoded in the security decoder 152, and the code length code is decoded from the codes shown in FIG. 4 to recognize the amount of the entire encoded data. Also on each portion of copyright protection, there are decoded the IP code indicating the information required for certification of the intellectual property right, the security start time code indicating the time for starting the copyright protection and the security end time code indicating the time for terminating the copyright protection and the respective information are acquired.

The information required for certification is entered in the security certification unit 153. In the absence of instruction from the security certification unit 153, the control signal generator 155 generates a control signal from the output signal 156 to the video decoding unit 1005, in such a manner that the video decoding unit 1005 executes decoding of the motion image data.

The security certification unit 153 executes comparison with the certification information acquired in advance or entered by the operator, thereby judging whether or not to permit decoding. In case decoding is permitted, the permission is informed to the control signal generator 155. In case the control signal is already generated so as that the video decoding unit 1005 executes decoding of the motion image data, such control signal is maintained.

On the other hand, in case the decoding is inhibited, the security certification unit 153 sends a signal for inhibiting the decoding to the control signal generator 155, which compares the information on the time of corresponding copyright protection (information decoded from the security start time code), entered from the security decoder 152, with the time entered from the timer 154, and outputs a signal for stopping the decoding of the motion image from the terminal 156 when the starting time for the copyright protection becomes equal to the above-mentioned time.

It also compares the information on the time of corresponding copyright protection (information decoded from the security end time code) with the time entered from the timer 154, and outputs a signal for re-starting the decoding of the motion image from the terminal 156 when the ending time for the copyright protection becomes equal to the above-mentioned time.

The video decoding unit 1005 receives the motion image encoded data from the memory device 1001 and the control signal from the security decoding unit 1004.

Figure 6:
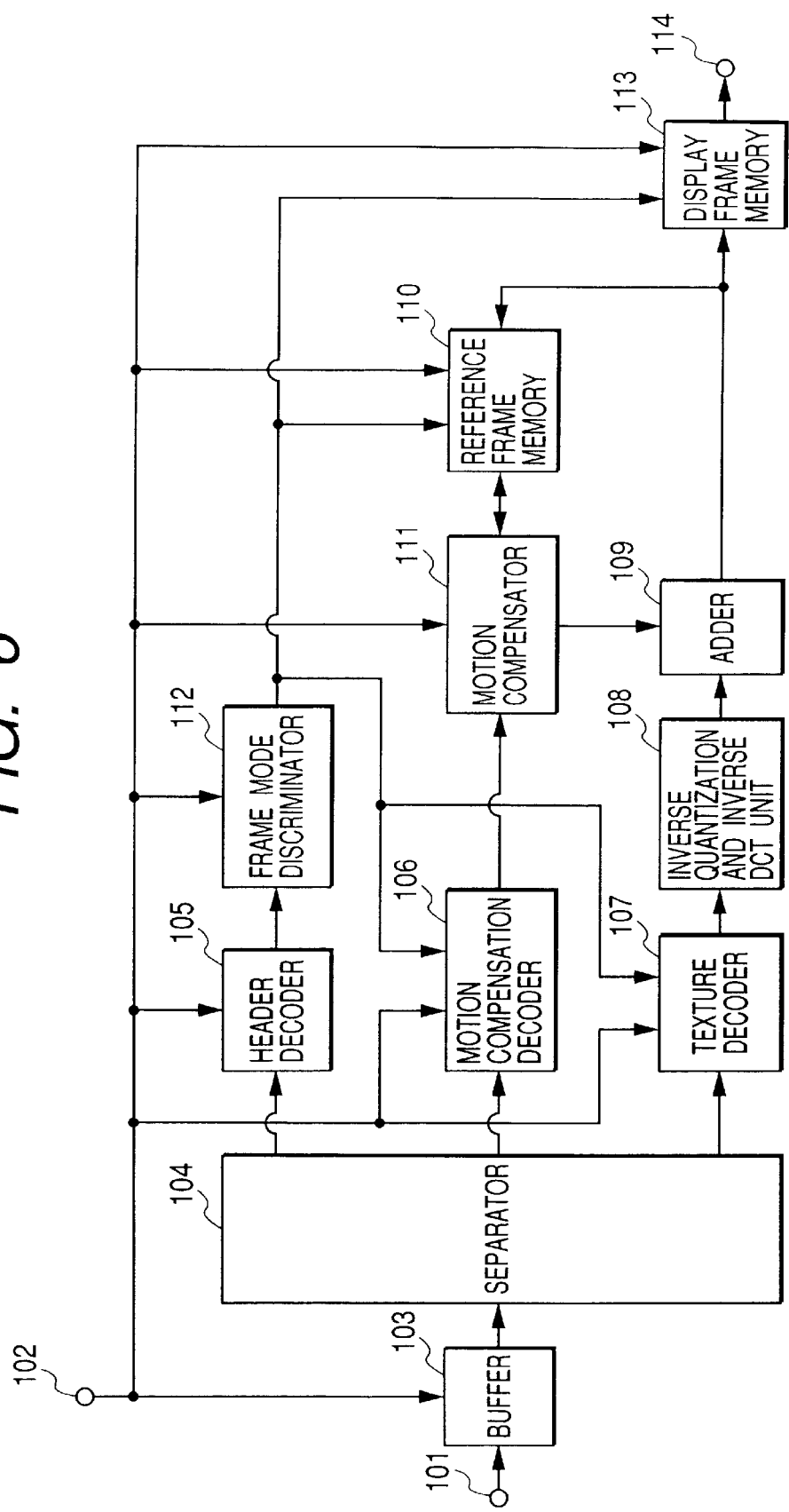
FIG. 6 is a block diagram showing the configuration of a video decoding unit 1005 in the first embodiment.

FIG. 6 is a detailed block diagram of the video decoding unit 1005.

Referring to FIG. 6, 101 indicates an image data input terminal for entering the motion image encoded data from the memory device 1001; and 102 indicates a control signal input terminal for entering the control signal from the security decoding unit 1004.

103 indicates a buffer for storing the entered motion image encoded data; and 104 indicates a separator for reading the MPEG-1 encoded data from the buffer 103 and separating header information indicating the content of codes, a motion compensation code for executing motion compensation, and data encoding DCT transformation coefficients.

105 indicates a header decoder for decoding the separated header information, thereby acquiring start codes, image size and encoding mode of each frame.

106 indicates a motion compensation decoder for decoding the motion compensation code, thereby decoding encoding mode of each macroblock, motion vector etc. and acquiring information required for the motion compensation, and 107 indicates a texture decoder for decoding the code thereby acquiring quantization coefficient, quantized result of DCT transformation coefficients etc.

108 indicates an inverse quantization/IDCT unit for receiving the quantization coefficient, quantized result of DCT coefficients etc., also executing inverse quantization and inverse DCT, thereby acquiring pixel data or error data by motion compensation.

109 indicates an adder for adding the result of motion compensation and the error data mentioned above; 110 indicates a reference frame memory for storing a reference frame required for the motion compensation; and 111 indicates a motion compensator for executing motion compensation on the content of the reference frame memory, according to the result of the motion vector decoder 106.

113 indicates a display frame memory for temporarily storing the image of the decoded frame for the purpose of display; and 112 indicates a frame mode discriminator for receiving the encoding mode of the frame from the header decoder 105 and discriminating I frame or P frame. The frame mode discriminator 112 control the reference frame memory 110, the display frame memory 113 etc. 114 indicates an output terminal for outputting the motion image data to the monitor 1006.

In the following there will be explained the decoding operation in the video decoding unit 1005 of the above-described configuration.

In case the control signal from the control signal input terminal 102 indicates that the decoding is possible, the buffer 103 receives the motion image encoded data from the image data input terminal 102 and stores such data. In case the control signal from the control signal input terminal 102 indicates that the decoding is inhibited, the buffer 103 does not store but discard the motion image encoded data.

At first there will be explained the function when the control signal indicates that the decoding is possible.

The separator 104 receives the encoded data from the buffer 103, and separates the header information indicating the content of codes, the motion compensation code for executing motion compensation, and the encoded data of DCT coefficients. The header decoder 105 decodes, from the header information separated by the separator 104, various start codes, image size and encoding mode of each frame, thereby acquiring these information.

The motion compensation decoder 106 decodes the motion compensation code separated by the separator 104, thereby decoding the encoding mode of each macroblock, motion vector etc. and acquiring the information required for motion compensation, and, in case of a P frame, sends these information to the motion compensator 111 to execute the motion compensation.

The texture decoder 107 decodes the encoded data separated by the separator 104, thereby acquiring the quantization coefficient, quantized result of DCT coefficients etc. The decoded quantized data are entered into the inverse quantization/IDCT unit 108 to determine the pixel data or the error data by motion compensation.

The above-mentioned error data are added, in the adder 109, to the output data from the motion compensator 111. The motion compensator 111 executes motion compensation on the reference frame memory 110, according to a value "0" in case of a macroblock for intraframe encoding or otherwise according to the motion vector obtained from the motion compensation decoder 106, and outputs the reference data to the adder 109.

The pixel values obtained in the adder 109 are stored in the reference frame memory 110 and the display frame memory 113. The image data stored in the display frame memory 113 are supplied through the output terminal 114 to the monitor 1006 and displayed thereon.

In the following there will be explained the decoding operation in case the control signal instructs the inhibition of decoding from a state where the decoding is permitted.

The buffer 103 stops the input of codes, and stops the function of the header decoder 105, motion compensation decoder 106, motion compensator 111 and texture decoder 107. It also inhibits update of the reference frame memory 110 and the display frame memory 113. As a result, the image data of the last decoded frame are outputted from the output terminal 114. Consequently the monitor 1006 continues to display the last decoded frame.

In the following there will be explained the decoding operation in case the control signal instructs the re-start of decoding by permitting the decoding from a state where the decoding is inhibited.

The buffer 103 re-starts the input of the codes, and activates the header decoder 105, which detects and judges the next start code. In case the start code of a frame is recognized, the encoding mode of such frame is supplied to the frame mode discriminator 112.

In case the encoding mode indicates a P frame, the frame mode discriminator 112 does not re-start the function of the motion compensation decoder 106, motion compensator 111 and texture decoder 107 and maintains the state of inhibiting the update of the reference frame memory 110 and the display frame memory 113.

In case the encoding mode indicates an I frame, the frame mode discriminator 112 re-starts the function of the motion compensation decoder 106, motion compensator 111 and texture decoder 107 and re-starts the update of the reference frame memory 110 and the display frame memory 113. Thereafter the function of various units is continued until the control signal is shifted to inhibit the decoding. Thus the display on the monitor 1006 is updated whereby the motion image display is re-started.

According to the above-described procedure, in case the decoding is re-started, the process is started from a frame of intraframe encoding thereby easily preventing perturbation of the image in the frame or interruption of the decoding operation.

Figure 7:
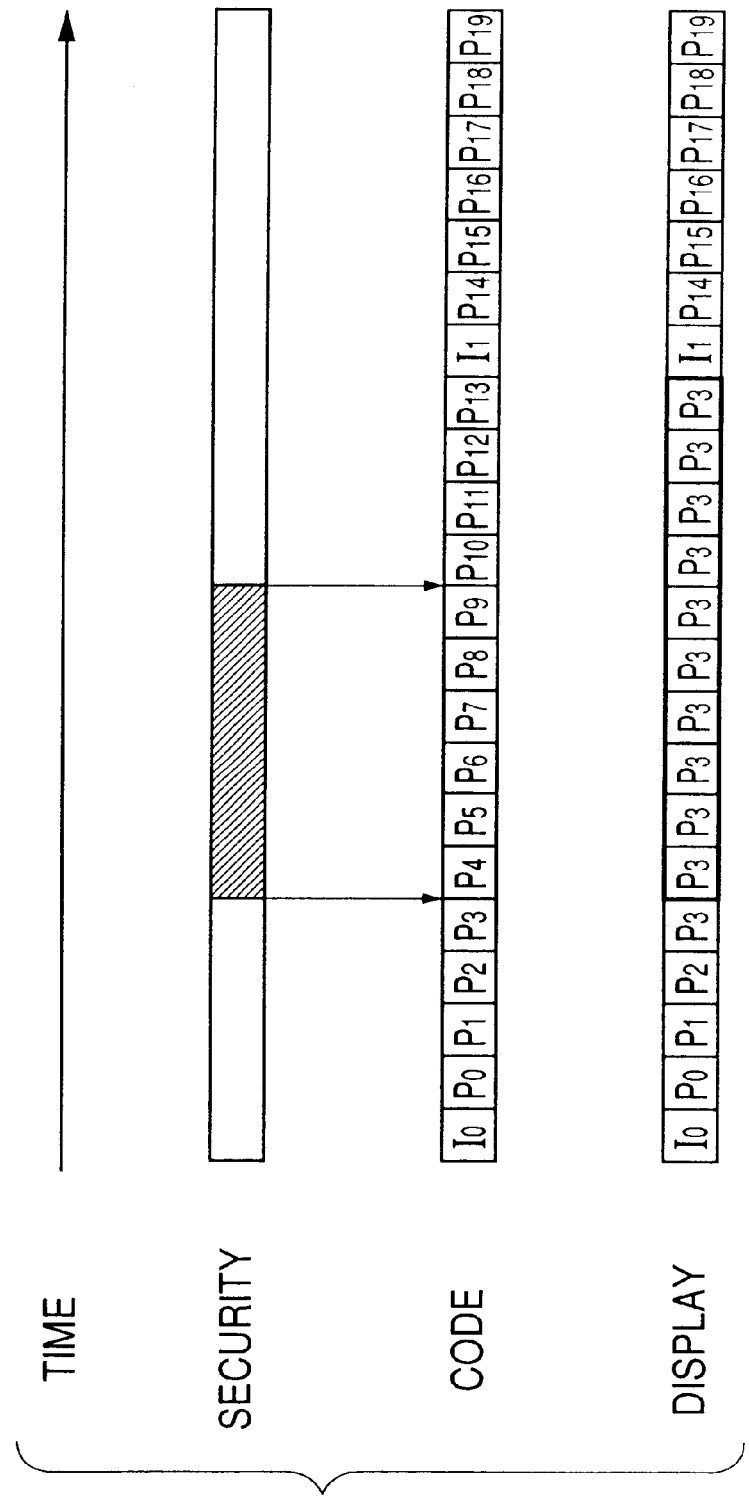
FIG. 7 is a view showing the mode of decoding in the first embodiment.

As an example, in case the decoding is inhibited by protection (security) of copyright in an encoding frame period $P_4$ to $P_9$ as shown in FIG. 7, the frame $P_3$ immediately before the security period is continuously displayed from the start of such security, and the decoding is re-started from the next $I_1$ frame whereby avoided is interruption or perturbation of the image, and the operator is relieved from the unpleasant image display.

In the present embodiment, during the period of inhibition of decoding, there is outputted the image decoded immediately before such inhibition, but it is also possible to stored a predetermined image in advance for example in a memory and to output such predetermined image.

Also in the present embodiment, the memory configuration is suitably modifiable. It is also effective for the communication data, by executing similar operations on the motion image data entered from the communication circuit 1002 through the communication interface 1003.

Figure 8:
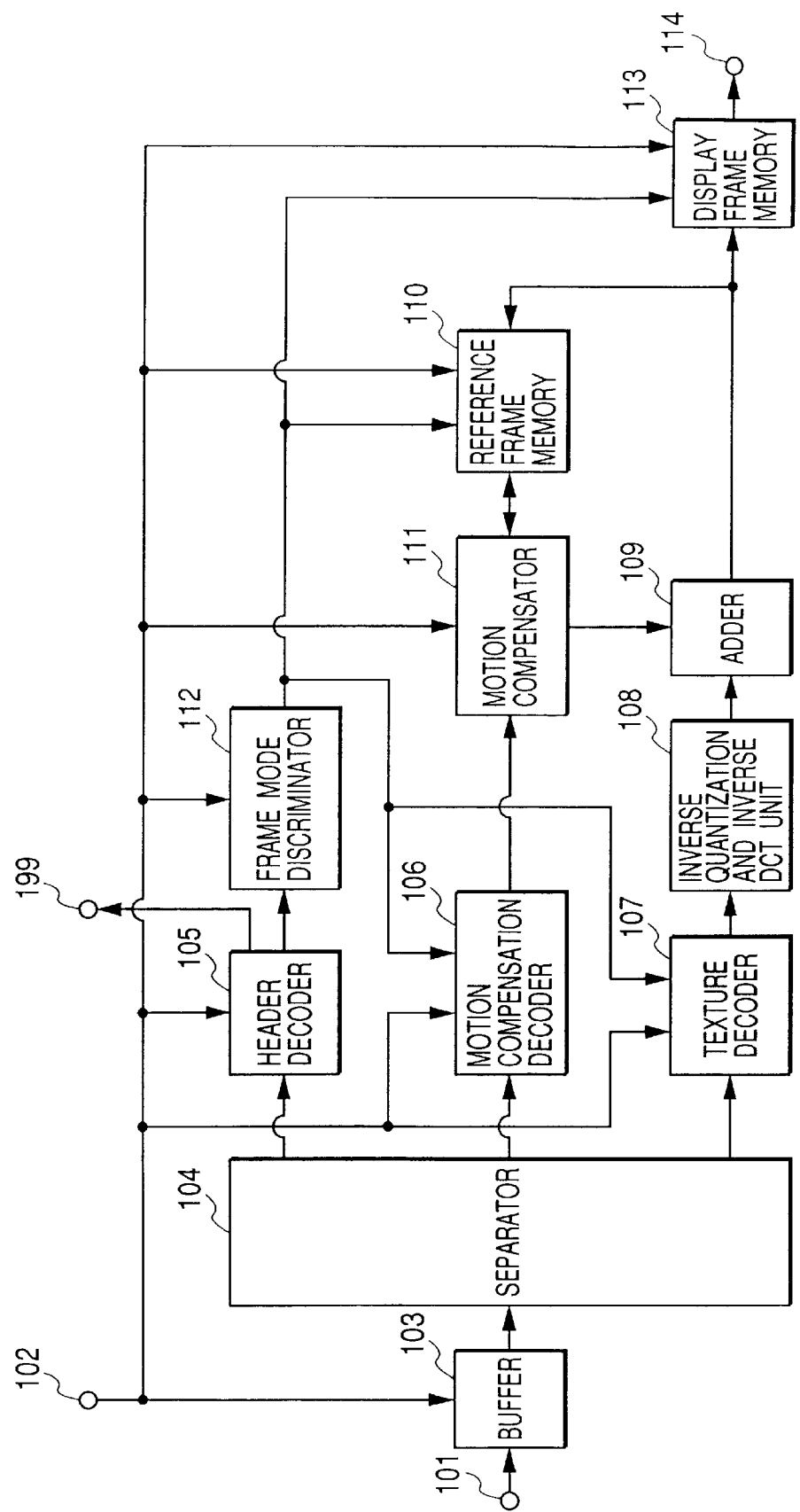
FIG. 8 is a view showing another configuration of the video decoding unit 1005 in the first embodiment.

It is furthermore possible to reconstruct synchronization with the audio data etc. at the re-start of decoding, by providing an output terminal 199 as shown in FIG. 8 and externally outputting the information of the header decoder 105, for example information on the decoding time of the frame (such as decoding result of time_code for a group of images or decoding result of temporal_reference code for a picture).

Figure 9:
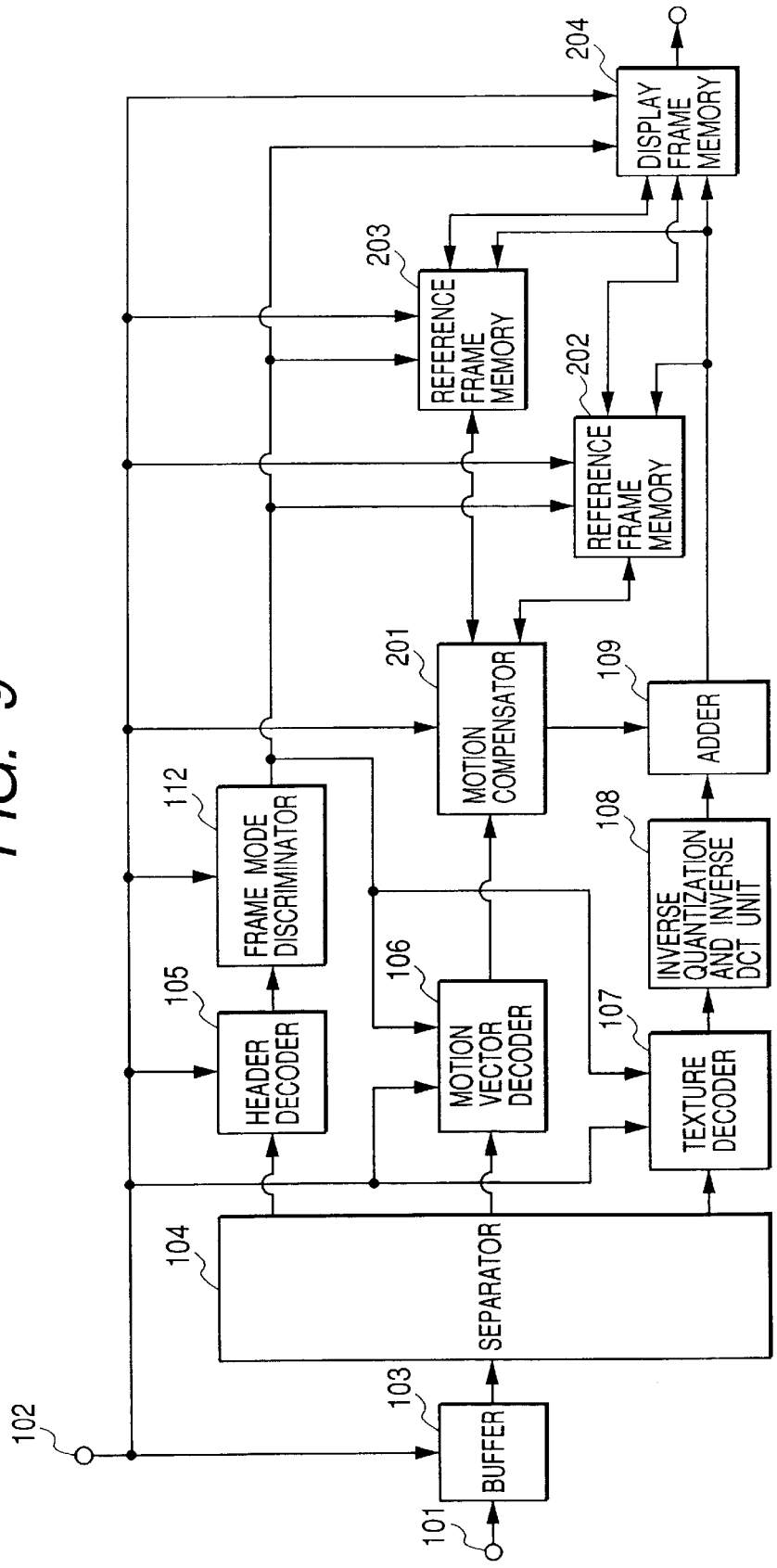
FIG. 9 is a view showing the configuration of the video decoding unit 1005 in a second embodiment of the present invention.

FIG. 9 is a block diagram showing the configuration of the video decoding unit 1005 in a second embodiment of the present invention, wherein components equivalent to those in the first embodiment are represented by corresponding numbers and will not be explained further.

In FIG. 9, there are shown a motion compensator 201 capable of bidirectional motion compensation for the B frame in addition to motion compensation for the P frame; and reference frame memories 202, 203 for storing reference frames required for the motion compensation and functioning similarly to the reference frame memory 110.

A display frame memory 204 functions similarly to the display frame memory 113, but receives inputs from the reference frame memories 202, 203 in addition to the adder 109.

In the following there will be explained the decoding process in the video decoding unit 1005 of the above-described configuration.

At first there will be explained the decoding operation in case the control signal indicates that the decoding is possible.

The separator 104 receives the encoded data from the buffer 103, separates various information, and distributes the codes to the header decoder 105, motion compensation decoder 106 and texture decoder 107.

The motion compensator 106 decodes the encoding mode of each macroblock, the motion vector etc. thereby acquiring the information required for motion compensation, and, in case of P or B frame, enters these information into the motion compensator 201 thereby executing the motion compensation. In case of a P frame, the motion compensator 201 executes motion compensation, referring to the content of the last renewed one of the reference frames 202, 203. In case of a B frame, the motion compensation is executed by referring to the reference frames 202, 203 and taking the content of the last updated frame as the reference frame of forward prediction and the other frame as the reference frame of rearward prediction.

The texture decoder 107 and the inverse quantization/IDCT unit 108 determine the pixel data or the error data by motion compensation, and the adder 109 adds the error data and the result from the motion compensator 201.

In case the pixel values (decoded image) determined by the adder 109 are an I or P frame, they are stored in one of the reference frame memories 202, 203, storing a frame decoder earlier in time. In case a B frame continues thereafter, the decoded image of the I or P frame is not stored in the display frame memory 204, but it is transferred from the reference frame memory 202 or 203 to the display frame memory 113 after the decoding of the B frame and the output thereof to the display memory.

In case the pixel values (decoded image) determined by the adder 109 are a B frame, they are stored in one of the reference frame memories 202, 203 but transferred to the display frame memory 204 only.

The image data stored in the display frame memory 204 are outputted through the output terminal 114 to the monitor 1006 and displayed thereon.

In the following there will be explained the decoding operation in case the control signal instructs the inhibition of decoding from a state where the decoding is permitted.

The buffer 103 stops the input of codes, and stops the function of the header decoder 105, motion compensation decoder 106, motion compensator 111 and texture decoder 107. It also inhibits renewal of the reference frame memories 202, 203 and the display frame memory 204.

If the frame mode discriminator 112 identifies that an I frame has been decoded, the inhibition of update is continued. If a P frame has been decoded, the decoded and written content is read from the reference frame memory 202 or 203 and transferred to the display frame memory 204 and then all the updates are inhibited. If a B frame has been decoded, the last updated content is read from the reference frame memory 202 or 203 and transferred to the display frame memory 204 and then all the updates are inhibited.

As a result, the image data of a frame last decoded in time are outputted from the output terminal 114. Therefore the monitor 1006 continues to display the last frame for which the decoding is permitted.

In the following there will be explained the decoding operation in case the control signal instructs the re-start of decoding by permitting the decoding from a state where the decoding is inhibited.

The buffer 103 re-starts the input of the codes, and activates the header decoder 105, which detects and judges the next start code. In case the start code of a frame is recognized, the encoding mode of such frame is supplied to the frame mode discriminator 112.

In case the encoding mode indicates a P or B frame, the frame mode discriminator 112 does not re-start the function of the motion compensation decoder 106, motion compensator 201 and texture decoder 107 and maintains the state of inhibiting the update of the reference frame memories 202, 203 and the display frame memory 204.

In case the encoding mode indicates an I frame, the frame mode discriminator 112 re-starts the function of the motion compensation decoder 106, motion compensator 201 and texture decoder 107 and re-starts the update of the reference frame memories 202, 203 and the display frame memory 204. The encoded data of a B frame, next to the I frame, are not decoded, and thereafter the decoding function of various units is continued for executing ordinary decoding and update operations, starting from the immediately succeeding I or P frame, until the control signal is shifted to inhibit the decoding. Thus the display on the monitor 1006 is re-started whereby the motion image display is re-started.

According to the above-described procedure, in case the decoding is re-started, the process is started from a frame of intraframe encoding thereby easily preventing perturbation of the image in the frame or interruption of the decoding operation.

Figure 10:
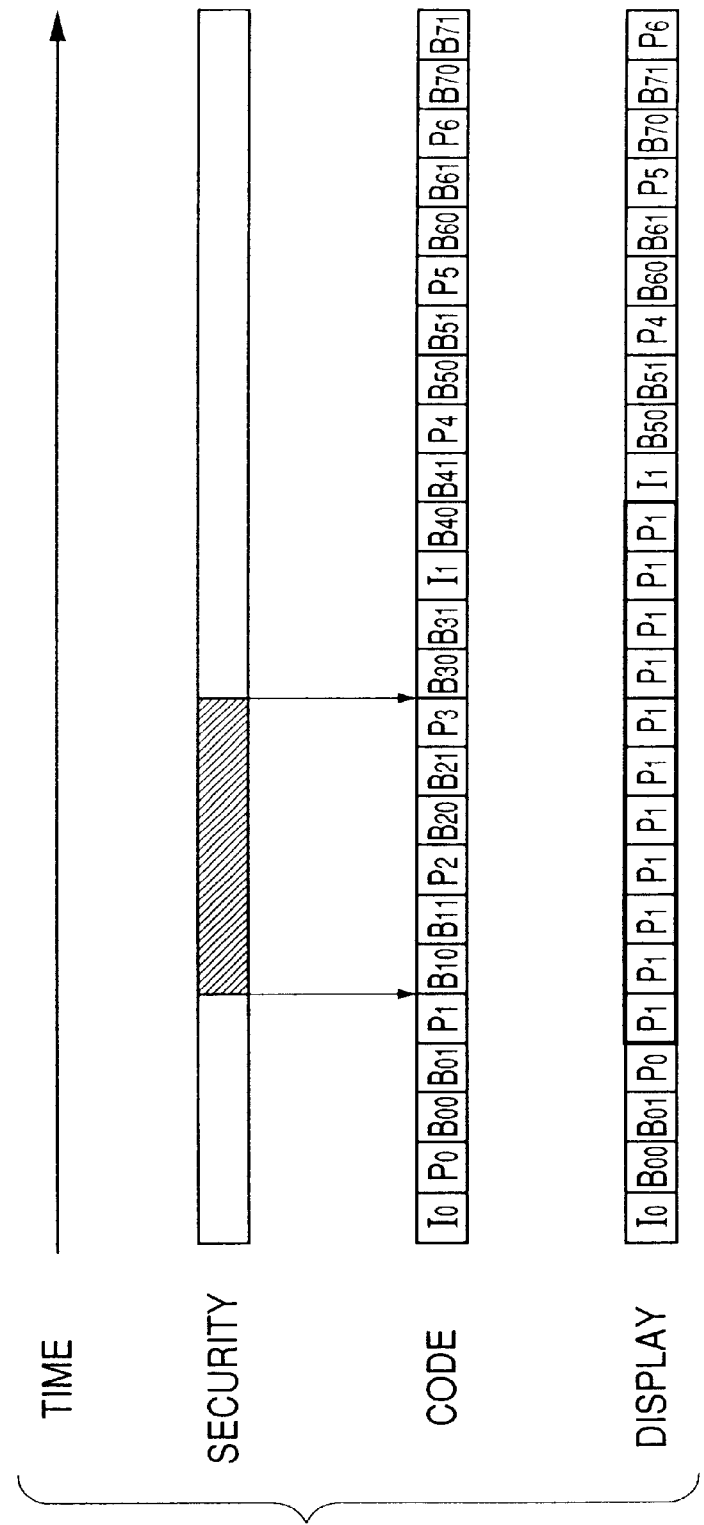
FIG. 10 is a view showing the mode of decoding in the second embodiment.

As an example, in case the decoding is inhibited by protection (security) of copyright in an encoding frame period $B_{10}$ to $P_3$ as shown in FIG. 10, the frame $P_1$ properly decoded immediately before the inhibition period is continuously displayed from the frame immediately preceding such inhibition period to the $I_1$ frame first appearing after such inhibition period, and the decoding is re-started from the $I_1$ frame whereby avoided is interruption or perturbation of the image, and the operator is relieved from the unpleasant image display.

In the present embodiment, during the period of inhibition of decoding, there is outputted the image decoded immediately before such inhibition, but it is also possible to stored a predetermined image in advance for example in a memory and to output such predetermined image.

Figure 11:
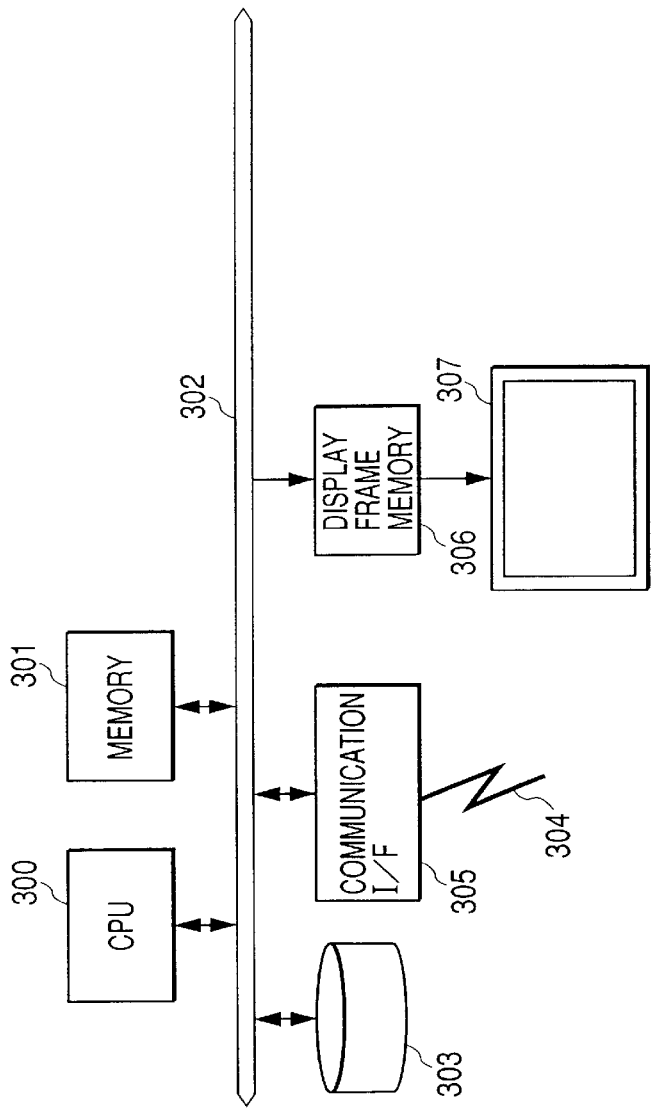
FIG. 11 is a block diagram showing the configuration of an image processing apparatus constituting a third embodiment of the present invention.

FIG. 11 is a block diagram showing the configuration of an image processing apparatus constituting a third embodiment of the present invention.

In FIG. 11, there are shown a central processing unit (CPU) 300 for controlling the entire apparatus and executing various processes; and a memory 301 providing memory areas required for the operating system (OS), softwares and calculations necessary for controlling the present apparatus.

There are also provided a bus 302 for connecting various units and exchanging data and control signals; a memory device 303 for storing motion image data; and a communication circuit 304 composed for example of a LAN, a public communication line, a wireless channel or broadcasting wave.

There are further provided a communication interface 305 for receiving the motion image data from the communication circuit 304; a display frame memory 306 for storing frame data of the motion image to be displayed; and a monitor 307 for displaying the reproduced motion image.

Figure 12:
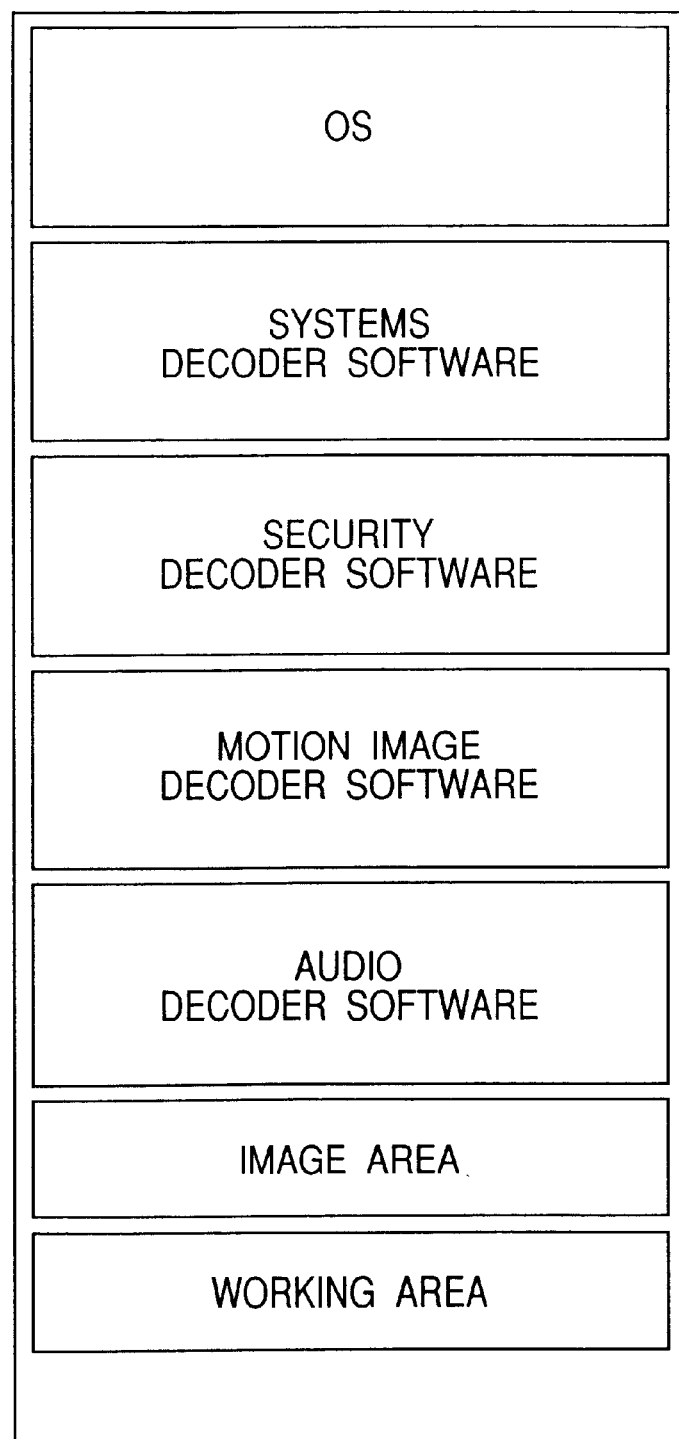
FIG. 12 is a view showing the content of a memory 301 in the third embodiment.

FIG. 12 shows the status of use and storage of the memory 301.

The memory 301 stores an operating system for controlling the entire apparatus and operating various softwares, a system decoder software for decoding the encoded data containing information for synchronization control of the audio data and the motion image, a security decoder software for decoding the encoded data for copyright protection, a motion image decoder software for decoding the motion image, and an audio decoder software for decoding the audio data. There are also provided an image area for storing the decoded image for the purpose of display or reference for motion compensation etc., and a working area for storing various operational parameters.

In the above-described configuration, the system decoder software is activated prior to the processing, in order to independently monitor the synchronization of the motion image and the audio data. Then the motion image data, composed of security encoded data, motion image encoded data and audio encoded data, are entered from the memory device 303 or the communication interface 305 and stored in the work area of the memory 301. In the following description, the motion image encoded data are assumed to be encoded by the MPEG-1 encoding method, but there may also be employed any other encoding method employing motion compensation.

FIG. 13 shows the configuration of the security encoded data employed in the third embodiment.

The security encoded data shown in FIG. 13 contain, in addition to the codes of the first embodiment shown in FIG. 4, an A/V flag 2005 for discriminating whether the copyright is for audio or for motion image.

Figure 14:
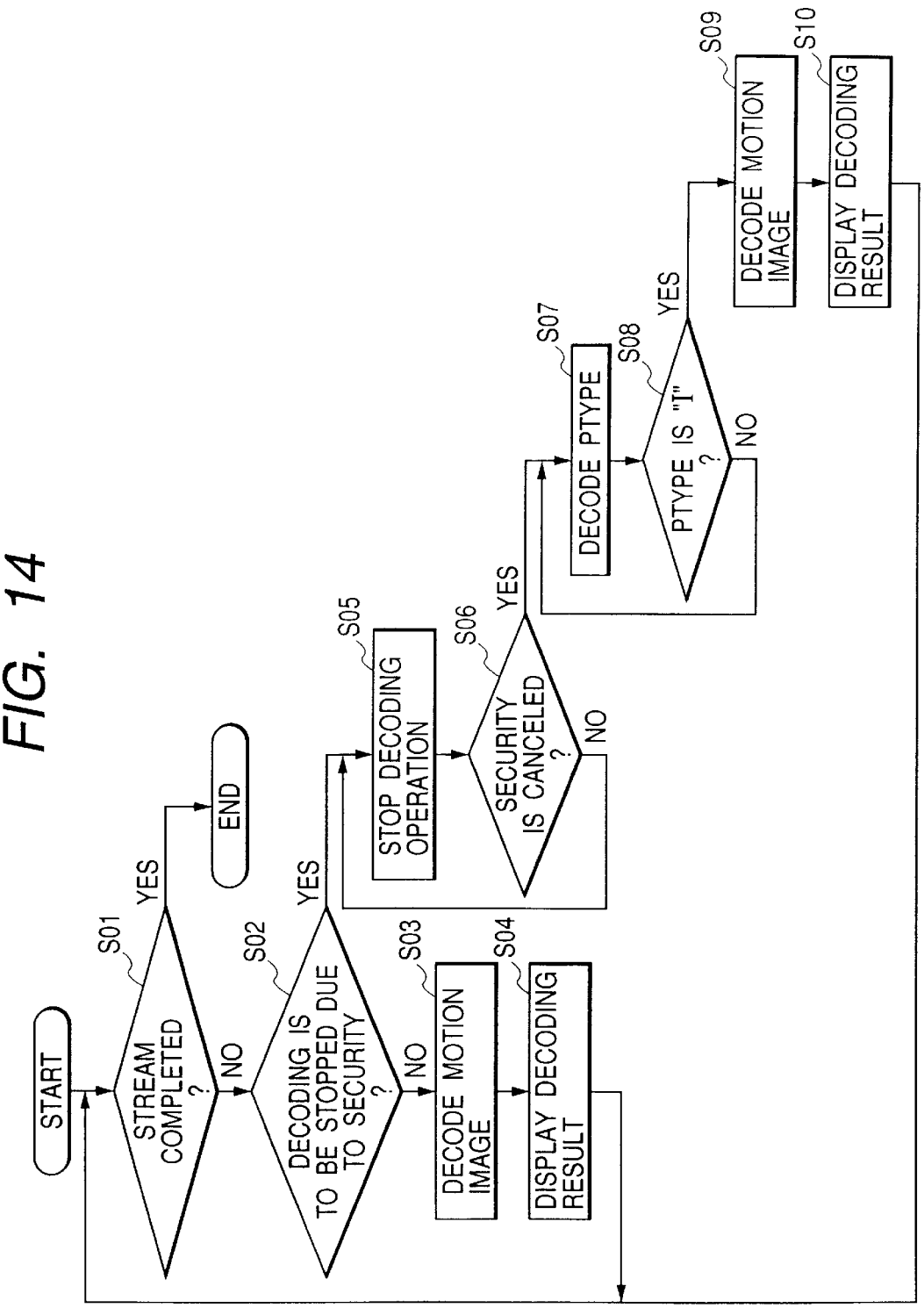
FIG. 14 is a flow chart showing the image processing operation in the third embodiment.

In the following there will be explained the decoding operation of the CPU 300, with reference to a flow chart shown in FIG. 14.

At first a step S01 discriminates whether a stream has been entered, and, if entered, the sequence proceeds to a step S02, but, if not, the sequence is terminated.

A step S02 activates the security decoder software for discriminating whether the decoding is permitted in the above-mentioned motion image data. If the result of decoding by the security decoder indicates permission of decoding, the sequence proceeds to a step S03, but, if inhibition, the sequence proceeds to a step S05.

A step S03 activates the motion image decoder software to decode the motion image according to the MPEG-1 decoding method, and stores the decoded image in the image area of the memory 301. Then a step S04 transmits the image data of the image area to the display frame memory 306 in the order of display, thereby executing display on the monitor 307 and the sequence returns to the step S01.

A step S05 deactivates the motion image decoder software. As the security can be independently set for the audio data and the motion image, the encoded data are read in synchronized manner in order to secure the synchronization even while the decoding is interrupted, but the read data are not stored in the working area of the memory 301 but are merely discarded.

A next step S06 discriminates whether the re-start of decoding is instructed by the security decoder, and, if not, the sequence returns to the step S05, but, if instructed, the sequence proceeds to a step S07.

If re-start of decoding is instructed from the security decoder (step S06), a step S07 activates the motion image decoder software from the stopped state, but at first executes decoding to the PTYPE code indicating the frame mode of each frame.

Then a step S08 discriminates whether the PTYPE indicates an I frame, and, if otherwise, the sequence returns to the step S07 to decode the next PTYPE code, but, if I frame, the sequence proceeds to a step S09.

A step S09 re-starts the decoding after the PTYPE code, thereby decoding the motion image according to the MPEG-1 decoding method, and stores the decoded image in the image area of the memory 301, whereupon the sequence proceeds to a step S10.

A step S10 transmits the image data of the image area to the display frame memory 306 in the order of display, thereby executing display on the monitor 307, and the sequence then returns to the step S01.

According to the above-described selection procedure, the entire apparatus or a part thereof can be realized by softwares. It is also rendered possible to apply security for protecting the copyright or the like independently for the audio data and the motion image.

In the following there will be given a detailed description on a fourth embodiment of the present invention, with reference to the attached drawings.

Figure 15:
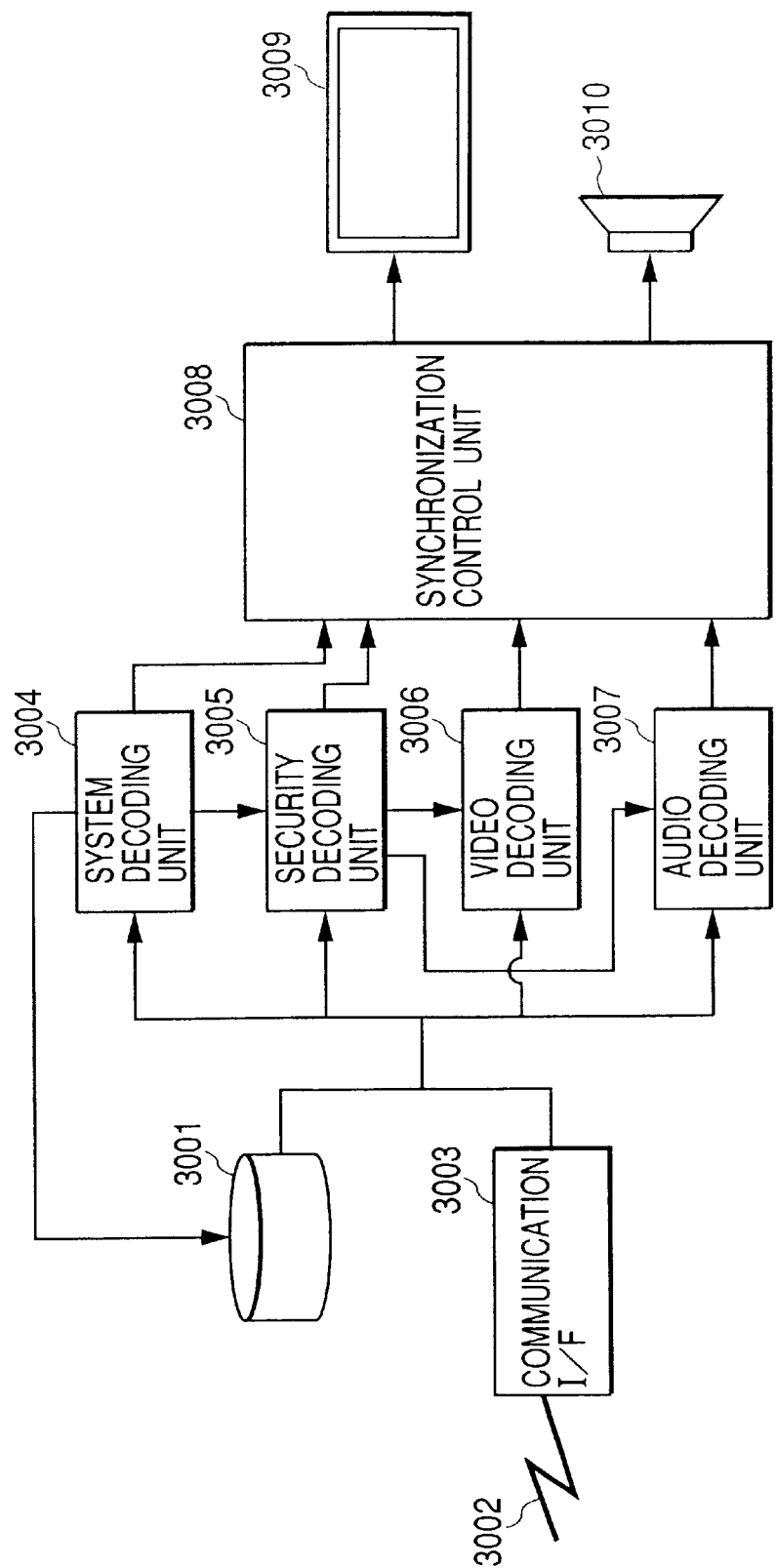
FIG. 15 is a block diagram showing the configuration of an image processing apparatus constituting a fourth embodiment of the present invention.

FIG. 15 is a block diagram showing the configuration of an image processing apparatus, constituting a fourth embodiment of the present invention.

In FIG. 15, a memory device 3001 is provided for storing the motion image data, which are composed of a scene description code, security encoded data containing information for protecting the intellectual property right (copying right being taken as an example in the present embodiment), video encoded data of each motion image, and audio encoded data.

In the following there will be given an explanation on the scene description encoded data.

Figure 16:
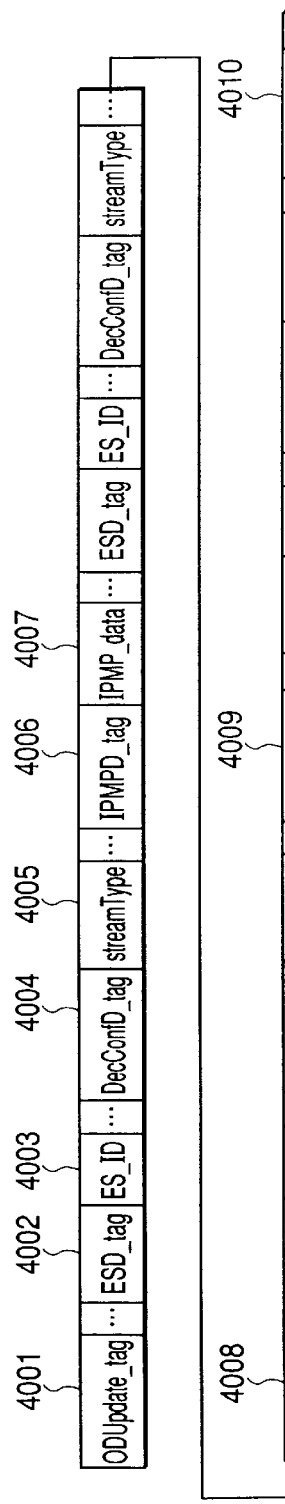
FIG. 16 is a view showing scene describing encoded data in the fourth embodiment.

FIG. 16 shows the configuration of the scene description encoded data.

In FIG. 16, there are shown a ODUpdate_tag code 4001 indicating the start of a sequence; an ESD_tag code 4002 indicating the start of description on each object; an ES_ID code 4003 for distinguishing each encoded data; a DecConfD_tag code 4004 for designating the decoder to be used for decoding; a stream Type code 4005 indicating the king of the succeeding encoded data; an IPMPD_tag code 4006 indicating the start of description on the security encoded data; an IPMP_data code 4007 describing certification of security or start timing of security; a CGCommand code 4008 containing encoded instructions required for generating CG among the scene description codes; an AudioDecode code 4009 indicating description on the audio encoded data; and a VideoDecode code 4010 indicating description on the video encoded data.

In the following there will be explained the security encoded data.

Figure 17:
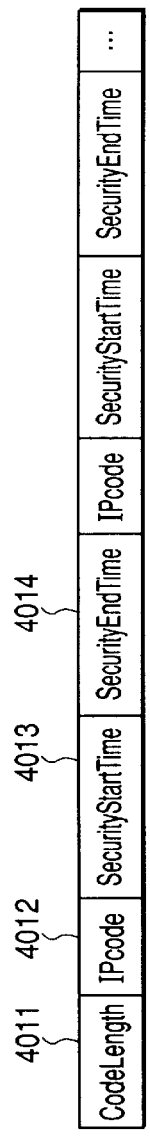
FIG. 17 is a view showing security encoded data in the fourth embodiment.

FIG. 17 shows the configuration of the security encoded data.

In FIG. 17, there are shown a CodeLength code 4011 indicating the code length of the security encoded data; an Ipcode code 4012 indicating information necessary for certifying the copyright; a SecurityStartTime code 4013 indicating the time for starting protection of the copyright etc.; and a SecurityEndTime code 4014 indicating the time for ending protection of the copyright etc. In the present embodiment, the data 4012 to 4014 can designate a portion to be secured in the motion image, so that, if plural portions to be secured are present in divided manner, plural sets of the data 4012 to 4014 will be present in consecutive manner, corresponding to such plural portions (cf. FIG. 17).

In the following there will be explained the video encoded data.

Figure 18:
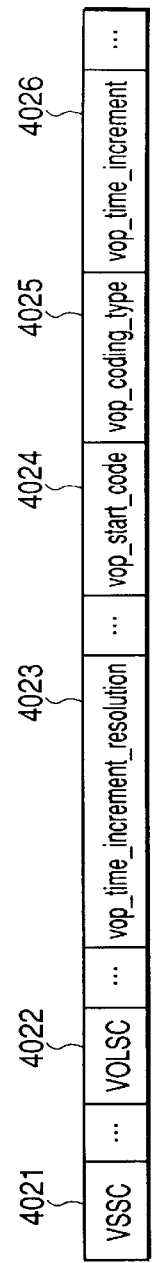
FIG. 18 is a view showing video encoded data in the fourth embodiment.

FIG. 18 shows the configuration of the video encoded data.

In FIG. 18, there are shown a visual_object_sequence_start_code (VSSC) code 4021 indicating the start of the video encoded data; a video_object_layer_start_code (VOLSC) code 4022 indicating the start of the motion image; a vop_time_increment_resolution code 4023 indicating the resolution in time for renewing the VOP (video object plane); a vop_start_code code 4024 indicating the start of VOP; a vop_coding_type code 4025 indicating the encoding mode of VOP, namely I frame/P frame/B frame; and a vop_time_increment code 4026 indicating the relative display time of a frame.

In the present embodiment, there will be explained a case where the motion image encoded data are encoded by the MPEG-4 encoding method. The MPEG-4 encoding method is detailedly described in ISO/IEC 14496-2 and will not, therefore, be explained further. For the purpose of brevity, it is assumed that the encoding is executed in the unit of a frame, and the data consist of I frames in which inframe encoding is conducted and P frames utilizing interframe correlation. For the motion image data, there may be employed any encoding method utilizing frames of intraframe encoding and interframe correlation. Naturally there may be employed encoding in the unit of a field.

Referring again to FIG. 15, there are shown a communication circuit 3002 composed for example a LAN, a public line, a wireless channel or broadcast wave; and a communication interface 3003 for receiving the motion image data from the communication circuit 3002.

There are also shown a system decoding unit 3004 for decoding the above-described scene description code; a security decoding unit 3005 for decoding the security encoded data and instructing the stopping and re-start of reproduction of the motion image through comparison with the certification data; a video decoding unit 3006 for decoding the motion image encoded data thereby reproducing the motion image; an audio decoding unit 3007 for decoding the audio encoded data thereby reproducing audio or sound signal; a synchronization control unit 3008 for outputting the decoded results in synchronization; and a monitor 3009 for displaying the reproduced motion image.

In the following there will be explained the processing for the motion image data in the apparatus of the above-described configuration.

At first the operator selects motion image data to be reproduced from the memory device 3001. The scene description encoded data of the selected motion image data are read and supplied to the system decoding unit 3004.

Now there will be explained the details of the system decoding unit 3004.

Figure 19:
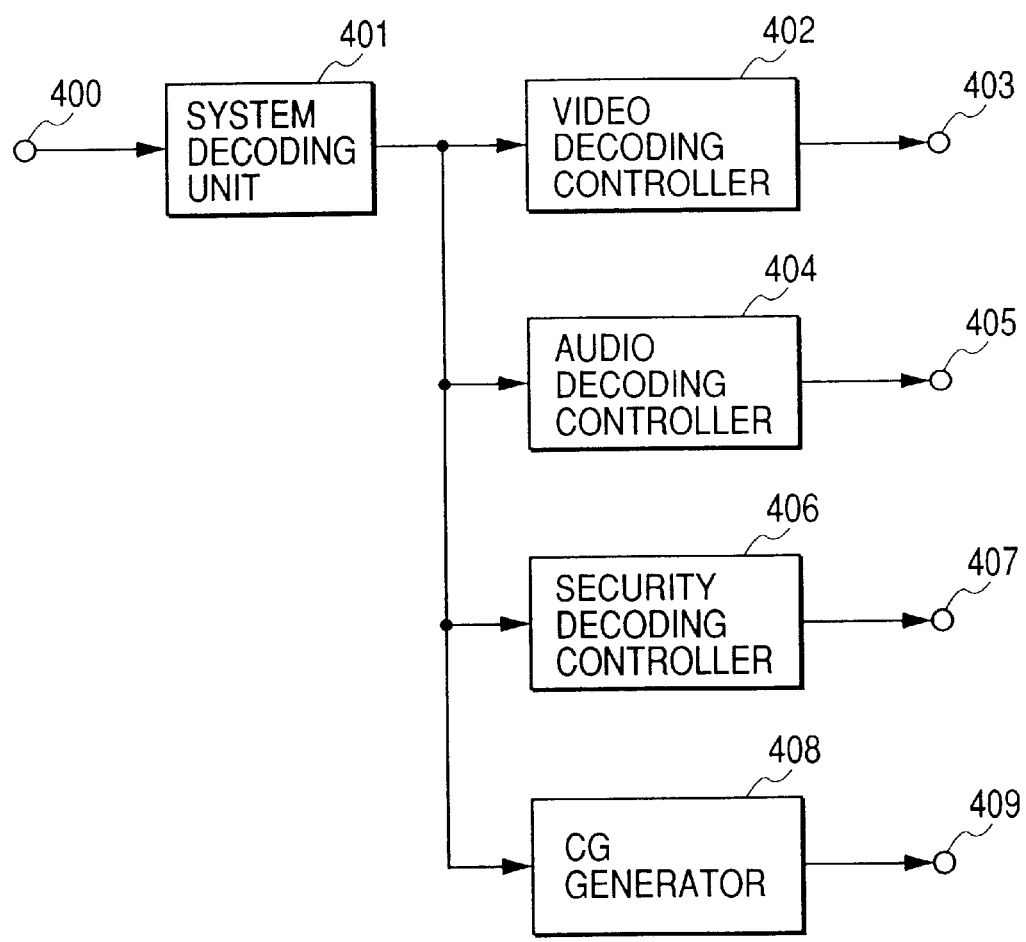
FIG. 19 is a block diagram showing the configuration of a system decoding unit 3004 in the fourth embodiment.

FIG. 19 is a block diagram showing the configuration of the system decoding unit 3004.

In FIG. 19, there are shown an input terminal 400 for entering scene description encoded data; a system decoder 401 for decoding the scene description encoded data; a video decoding controller 402 for controlling the start etc. of decoding of the video encoded data; and an output terminal 403 for outputting the control signal, supplied from the video decoding controller, to the video decoding unit 3006 and the synchronization control unit 3008.

There are also provided an audio decoding controller 404 for controlling the start etc. of decoding of the audio encoded data; and an output terminal 405 for outputting the control signal, supplied from the audio decoding controller, to the audio decoding unit 3007.

There are further provided a security decoding controller 406 for controlling the start etc. of decoding of the security encoded data; an output terminal 407 for outputting the control signal, from the security decoding controller, to the security decoding unit 3005 and the synchronization control unit 3008; and a CG generator 408; and a CD image 409 generated by the CG generator.

In the following there will be explained the decoding function of the system decoding unit 3004 of the above-described configuration.

The scene description code received from the input terminal 400 is entered into the system decoder 401. The system decoder 401 decodes the ODUpdate_tag code in the encoded data of the configuration shown in FIG. 16, thereby detecting the start of a sequence. Then it decodes the ESD_tag code 4002 to detect the start of description on each object. Then it decodes the ES_ID code 4003 thereby acquiring the information for distinguishing the encoded data of each object. It then decodes the DecConfID_tag code 4004 to determine the decoder to be used for decoding the selected encoded data. The stream Type code 4005 indicates whether the ensuing encoded data are CD encoded data, security encoded data, video encoded data or audio encoded data. Based on these results, the decoder is selected and the decoding controllers are activated. Thereafter, the subsequent codes are decoded whereby acquired is information describing each encoded data.

The acquired information are entered into the video decoding controller 402, audio decoding controller 404, security decoding controller 406 and CG generator 409. More specifically, the decoded result of the VideoDecode code 4010 is supplied to the video decoding controller 402; that of the AudioDecode code 4009 is supplied to the audio decoding controller 404; the decoded results of the IPMPD_tag code 4006 and the IPMP_data code 4007 are supplied to the security decoding controller 406; and the decoded result of the CGCommand code 4008 is supplied to the CG generator 408. These descriptions contain the timing of decoding etc. of each encoded data and a pointer indicating the storage location of each encoded data.

Based on the decoded result of the VideoDecode code 4010, the video decoding controller 402 reads the video encoded data, stored in the memory device 3001, in the timing of display, causes the video decoding unit 3006 to execute decoding, generates the control signal so as to enable display in synchronization, and executes output to the memory device 3001 and the synchronization control unit 3008 through the output terminal 403.

Also based on the decoded result of the AudioDecode code 4009, the audio decoding controller 404 reads the audio encoded data, stored in the memory device 3001, in the timing of display, causes the audio decoding unit 3007 to execute decoding, generates the control signal so as to enable reproduction in synchronization, and executes output to the memory device 3001 and the synchronization control unit 3008 through the output terminal 405.

Also based on the decoded result of the IPMP__data code 4007, the security decoding controller 406 reads the security encoded data, stored in the memory device 3001, generates the control signal so as to enable decoding in the security decoding unit 3005, and executes output to the memory device 3001, security decoding unit 3005 and the synchronization control unit 1008 through the output terminal 407.

Also based on the decoded result of the CGCommand code 4008, the CG generator 408 generates the CG image by lettering, and outputs the CG data to the synchronization control unit 3008 through the output terminal 409 and, at the same time, the control signal on synchronization to the synchronization control unit 3008.

Now there will be explained the details of the security decoding unit 3005.

Figure 20:
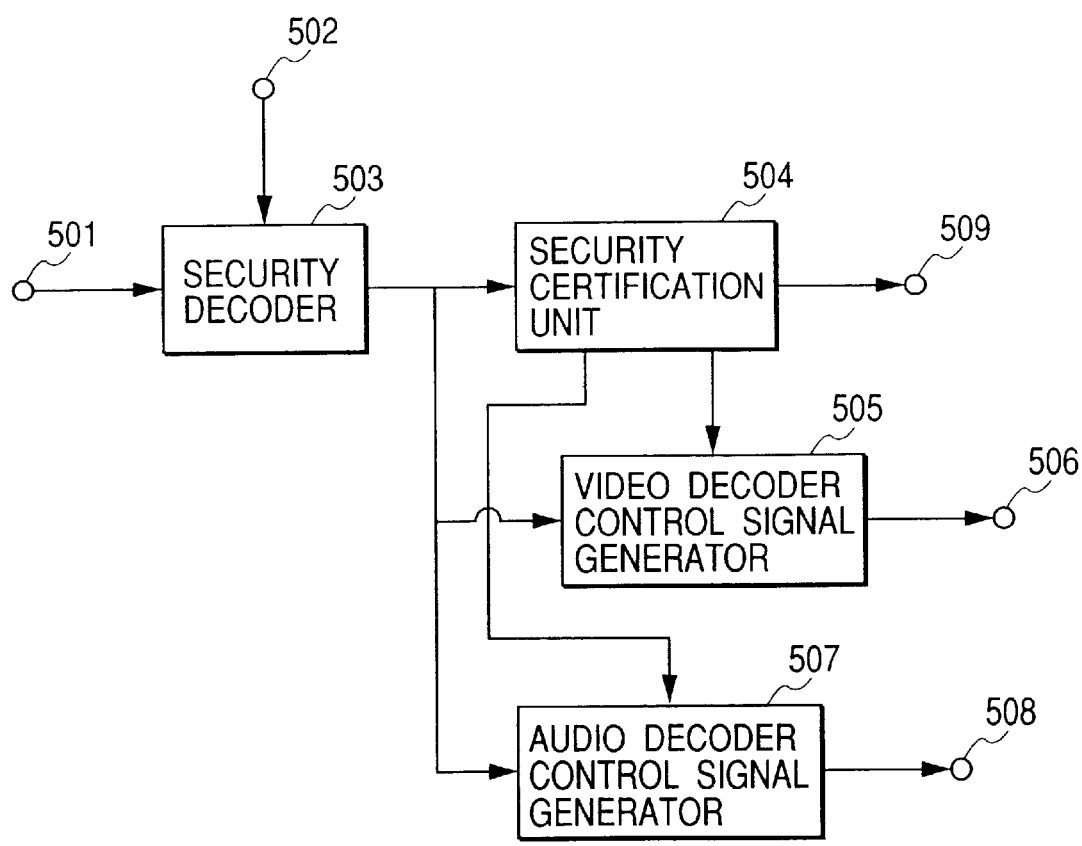
FIG. 20 is a block diagram showing the configuration of a security decoding unit 3005 in the fourth embodiment.

FIG. 20 is a block diagram showing the configuration of the security decoding unit 3005.

In FIG. 20, there are provided an input terminal 501 for entering the security encoded data from the memory device 3001; and an input terminal 502 for entering the control signal from the security decoding controller 407.

There are also provided a security decoder 503 for decoding the security encoded data thereby acquiring information on the certification information and time for copyright protection; and a security certification unit 504 for analyzing the certification information thereby determining whether to permit or inhibit the decoding.

There are further provided a video decoding control signal generator 505 for generating a signal for controlling the video decoding unit 3006 according to the determination of the security certification unit 504; and an output terminal 506 for outputting the control signal, generated by the video decoding control signal generator 505, to the video decoding unit 3006 and the synchronization control unit 3008.

There are further provided an audio decoding control signal generator 507 for generating a signal for controlling the audio decoding unit 3006 according to the determination of the security certification unit 504; an output terminal 508 for outputting the control signal, generated by the audio decoding control signal generator 507, to the audio decoding unit 3007; and an output terminal 509 for outputting, to the synchronization control unit 3008, a control signal indicating whether the decoding is inhibited by the security.

In the following there will be explained the decoding function of the security decoding unit 3005 of the above-described configuration.

The security encoded data entered from the input terminal 501 are decoded by the security decoder 503 according to the control signal from the security decoding controller 406. Among the codes shown in FIG. 17, the CodeLength code 4011 is decoded to acquire the amount of the entire encoded data, and, for each portion of copyright protection, the IPcode 4012 indicating the information necessary for certifying the copyright, the SecurityStartTime code 4013 indicating the start time of copyright protection, and the SecurityEndTime code 4014 indicating the end time of copyright protection are respectively decoded to acquire the security information.

The information necessary for certification is entered into the security certification unit 504, which executes comparison with the certification information acquired in advance or entered by the operator, thereby discriminating whether the decoding of the object video or audio encoded data is to be permitted.

In case of permission of decoding, the permission for decoding is informed to the video decoding control signal generator 505 or the audio decoding control signal generator 507. In the absence of instruction from the security certification unit 504, the video decoding control signal generator 505 outputs the control signal from the output terminal 506 to the video decoding unit 3006 so as to enable therein the decoding of the video encoded data. Also in case of audio, in the absence of instruction from the security certification unit 504, the control signal is generated from the output terminal 508 to the audio decoding unit 3007 so as to enable therein the decoding of the audio encoded data.

In this state, if the video decoding unit 3006 has already generated the control signal for executing the decoding of the video encoded data, such control signal is retained.

On the other hand, in case the decoding is inhibited, the security certification unit 504 outputs a signal inhibiting the decoding to the video decoding control signal generator 505. Based on the information (obtained by decoding the SecurityStartTime code) on the time of copyright protection, entered from the security encoder 503, the video decoding control signal generator 505 outputs, from the output terminal 506, a signal for stopping the decoding of the motion image when the time for starting the copyright protection is reached.

Also based on the information (obtained by decoding the SecurityEndTime code) on the time of copyright protection, it outputs, from the output terminal 506, a signal for re-starting the decoding of the motion image when the time for ending the copyright protection is reached.

The video decoding unit 3006 receives the motion image encoded data from the memory device 3001 and the control signal from the security decoding unit 3005.

Now there will be explained the details of the video decoding unit 3006.

Figure 21:
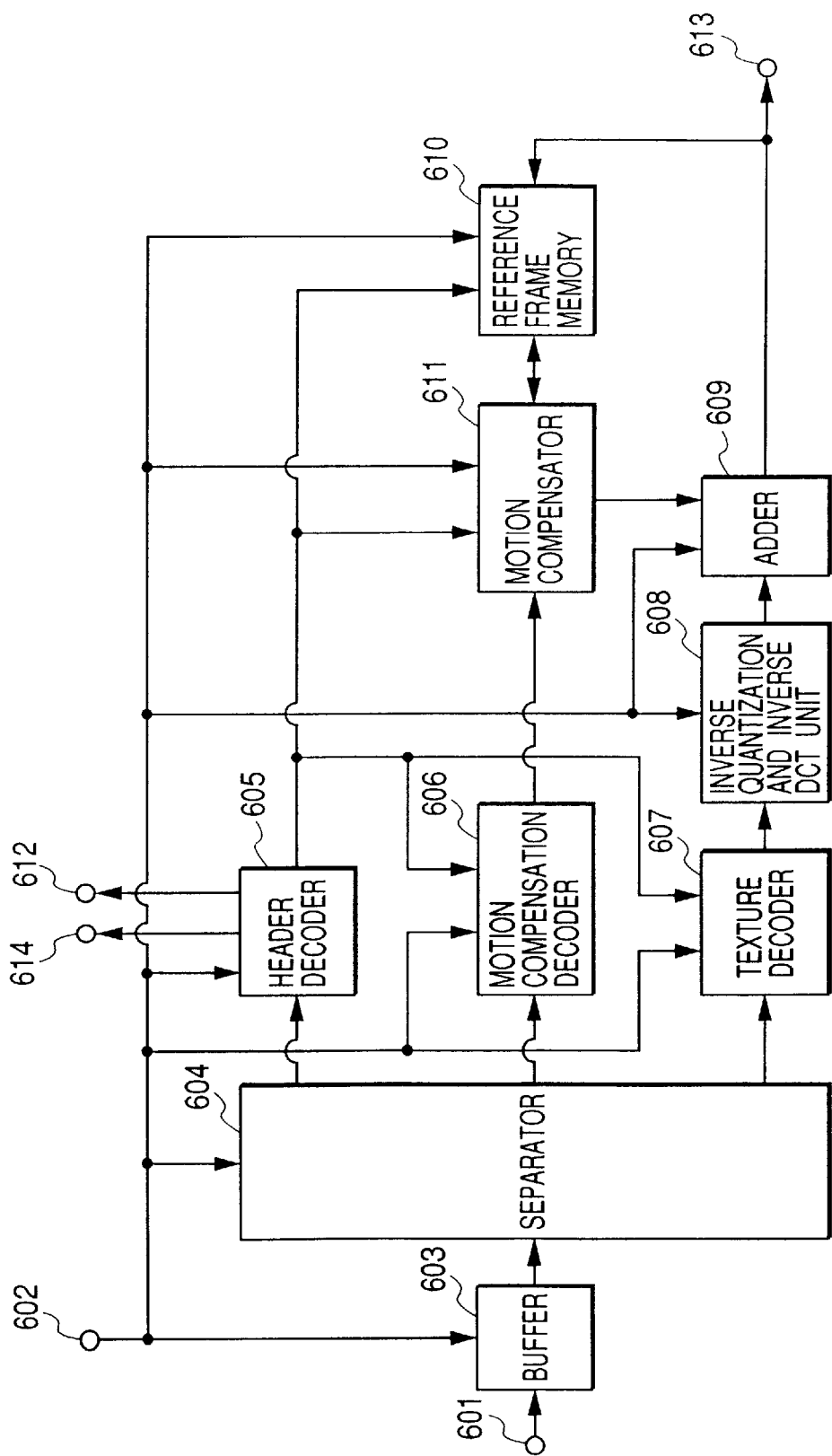
FIG. 21 is a block diagram showing the configuration of a video decoding unit 3006 in the fourth embodiment.

FIG. 21 is a block diagram showing the configuration of the video decoding unit 3006.

In FIG. 21, there are shown an image data input terminal 601 for receiving the motion image encoded data from the memory device 3001; and a control signal input terminal 602 for receiving the control signal from the security decoding unit 3005.

There are also shown a buffer 603 for storing the entered motion image encoded data; and a separator 604 for reading the MPEG-1 encoded data from the buffer 603 and separating therefrom header information representing the content of the codes, a motion compensation code for executing motion compensation, and encoded data of the DCT coefficients.

A header decoder 605 for decoding the separated header information decodes various start codes, image size and encoding mode of each frame, thereby acquiring corresponding information.

A motion compensation decoder 606 decodes the encoding mode, motion vector etc. of each macroblock, thereby acquiring information necessary for the motion compensation. A texture decoder 607 decodes the codes thereby acquiring the quantization coefficient and quantized result of the DCT coefficients.

An inverse quantization/IDCT unit 608 receives the quantization coefficient and the quantized result of the DCT coefficients, executes inverse quantization and inverse DCT transformation, and acquires the pixel data or the error data by motion compensation.

There are also provided an adder 609 for adding the result of motion compensation and the above-mentioned error data; a reference frame memory 610 for storing a reference frame required for the motion compensation; and a motion compensation unit 611 for executing motion compensation on the content of the reference frame memory 610 according to the result of the motion compensation decoder 606.

An output terminal 612 detects the encoding mode of the frame from the header decoder 605 and outputs it to the synchronization control unit 3008. An output terminal 613 outputs the decoded motion image data to the synchronization control unit 3008.

A terminal 614 is provided for acquiring and outputting the information on the reproducing time of a frame from the header decoder 606, namely information on the display time, based on the result of decoding of the vop_time_increment_resolution code 4023 and the vop_time_increment code 4026.

In the following there will be explained the decoding process in the video decoding unit 3006 of the above-described configuration.

In case the control signal from the control signal input terminal 602 indicates that the decoding is permitted, the buffer 603 inputs motion image encoded data from the image data input terminal 601 stores such information. In case the control signal from the control signal input terminal 602 indicates that the decoding is inhibited, the buffer 603 does not store but discard the motion image encoded data.

At first there will be explained the decoding operation in case the control signal indicates that the decoding is possible.

The separator 604 receives the encoded data from the buffer 603 and separates the header information representing the content of the codes, the motion compensation code for executing motion compensation, and the encoded data of the DCT coefficients.

The header decoder 605 decodes, from the header information separated by the separator 604, various start codes, image size and encoding mode of each frame thereby acquiring the corresponding information. The synchronization control unit 1008 receives the encoding mode of each frame from the terminal 112 and the information on the reproducing time of frame from the terminal 614.

The motion compensation decoder 606 decodes the motion compensation code separated by the separator 604, decodes the encoding mode, motion vector etc. of each macroblock thereby acquiring the information necessary for motion compensation, and outputs these information to the motion compensation unit 611 in case of a P frame, thereby executing motion compensation.

The texture decoder 607 decodes the encoded data separated by the separator 604, thereby acquiring the quantization coefficient, the quantized result of DCT coefficients etc. The decoded quantized data are supplied to the inverse quantization/IDCT unit 108, thereby determining the pixel data or the error data by motion compensation.

The error data mentioned above are added with the output data of the motion compensator 611 in the adder 609. The motion compensator 611 executes motion compensation on the reference frame memory 610, based on a value "0" in case of a macroblock of inframe encoding or otherwise according to the motion vector obtained from the motion compensation decoder 606, and outputs the reference data to the adder 609. The pixel values determined in the adder 609 are supplied to the reference frame memory 610 and the output terminal 613.

In the following there will be explained the decoding operation in case the control signal indicates that the decoding is inhibited.

The buffer 603 stops the code input and terminates the function of the header decoder 605, motion compensation decoder 606, motion compensation 611 and texture decoder 607. It also inhibits the renewal of the reference frame memory 610. As a result, the output terminal 613 outputs the image data of the last decoded frame.

In the following there will be explained the decoding operation in case the control signal instructs the permission for decoding from a state in which the decoding is inhibited, thereby re-starting the decoding.

The buffer 603 re-starts the input of codes and activates the header decoder 605. The header decoder 605 detects and discriminates the next start code. In case the start code of a frame is recognized, the frame mode is decoded and the encoding mode of the frame is outputted to the synchronization control unit 3008.

In case the encoding mode of the frame is a P frame, the header decoder 605 does not re-start the function of the motion compensation decoder 606, motion compensator 611 and texture decoder 607 and retains the state in which the update of the reference frame memory 610 is inhibited.

In case the encoding mode of the frame is an I frame, the header decoder re-starts the function the motion compensation decoder 606, motion compensator 611 and texture decoder 607 and re-starts the update of the reference frame memory 610. Thereafter the function of various units is continued until the control signal inhibits the decoding.

Now there will be explained the details of the synchronization control unit 3008.

Figure 22:
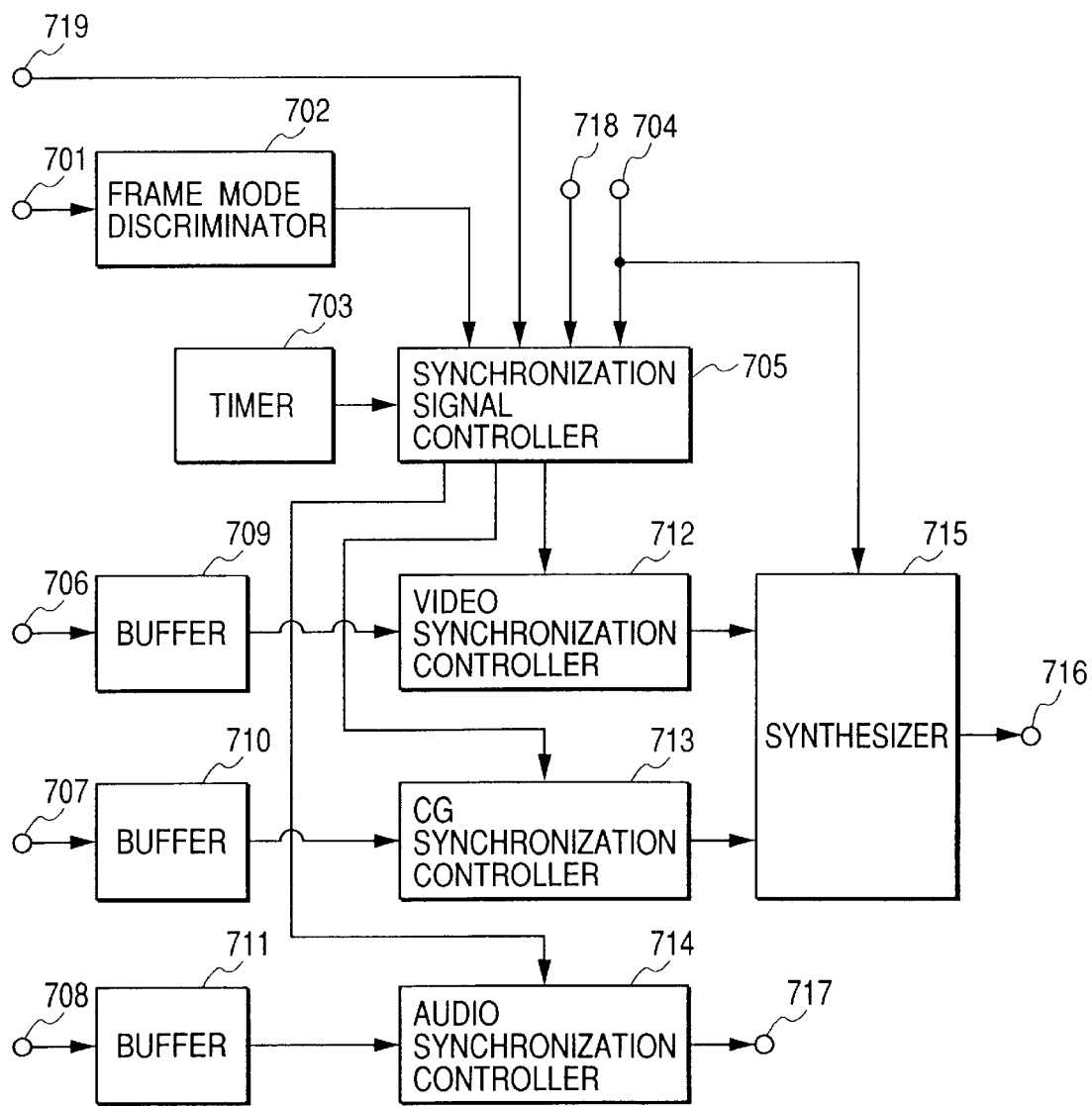
FIG. 22 is a block diagram showing the configuration of a synchronization control unit 3008 in the fourth embodiment.

FIG. 22 is a block diagram showing the configuration of the synchronization control unit 3008.

In FIG. 22, there are shown an input terminal 701 for receiving the frame mode from the video decoding unit 3006; a frame mode discriminator 702 for discriminating the entered frame mode; a timer 703 for synchronization; a terminal 704 for receiving information on synchronization and synthesis from the system decoding unit 3004; and a synchronization signal controller 705 for controlling the synchronization based on these information.

There are also shown a terminal 706 for receiving the motion image data, obtained by decoding the video encoded data, from the video decoding unit 3006; a terminal 707 for receiving CG image data from the CG generator 408 of the system decoding unit 3004; and a terminal 708 for receiving audio data, obtained by decoding the audio encoded data, from the audio decoding unit 3007.

Buffers 709, 710, 711 are provided for temporarily storing the data in order to adjust the synchronization thereof, and respectively store motion image data, CG image data and audio data.

There are further provided a video synchronization controller 712 for synchronizing and outputting the motion image data; a CG synchronization controller 713 for synchronizing and outputting the CG image data; an audio synchronization controller 714 for synchronizing and outputting the audio data; a synthesizer 715 for synthesizing the CG image data and the motion image data; a terminal 716 for outputting the synthesized result to the monitor 3009;

and a terminal 717 for outputting the reproduced audio data to a speaker 3010.

There are further provided an input terminal 718 for receiving the information on the reproducing time of the frame from the video decoding unit 3006; and an input terminal 719 for receiving, from the security decoding unit 3005, information indicating whether each data are secured and decoding thereof is inhibited.

In the following there will be explained the decoding process in the synchronization control unit 3008 of the above-described configuration.

The motion image data, CG image data and audio data entered from the terminals 706, 707, 708 are respectively stored in the buffers 709, 710, 711. The synchronization control signal controller 705 compares the timings of reproduced outputs of various data from the system decoding unit 3004 and the reproducing time of the motion image data, with the time of the timer 303 and generates signals for controlling the video synchronization controller 712, the CG synchronization controller 713 and the audio synchronization controller 714. According to these signals, the video synchronization controller 712, the CG synchronization controller 713 and the audio synchronization controller 714 read and output the data from the buffers 709, 710, 711 in synchronization.

The motion image data and the CG image data, outputted from the video synchronization controller 712 and the CG synchronization controller 713, are synthesized by arrangement or deformation, according to the information on synthesis from the terminal 704, and outputted as the image data through the terminal 716 to the monitor 3009 thereby being displayed thereon. Also the audio data are outputted through the terminal 717 to the speaker 3010 and reproduced therein.

When security is applied to the motion image and the decoding is inhibited, such status is received from the terminal 719. In response, the synchronization signal controller 705 so instructs the video synchronization controller 712 to terminate the synchronization on the motion image data. In response, the video synchronization controller 712 stops the display of the motion image data. Thus the CG image data alone are outputted through the synthesizer 715 to the terminal 716.

When security on the motion image is relieved and the decoding is re-started, such status is received from the terminal 719. However, the synchronization signal controller 705 does not immediately activate the video synchronization controller 712, but receives the encoding mode of each frame from the terminal 701 and discriminates the frame mode. Such state is retained until an I frame is identified. When an I frame is entered, the reproducing time of the frame is entered from the terminal 718 and is compared with the time of the timer 703. Thus there is given an instruction so as to activate the video synchronization controller 712 from the encoded data of the I frame, and the motion image data of the I frame are read from the buffer 709 and supplied to the synthesizer 715.

According to the above-described selection procedure, in case the decoding is re-started, the information of the frame mode is used for synchronization control to secure the synchronization with other data and to start the synchronization from the frame of inframe encoding, thereby easily preventing perturbation of the image in the frame or interruption of the decoding operation.

Figure 23:
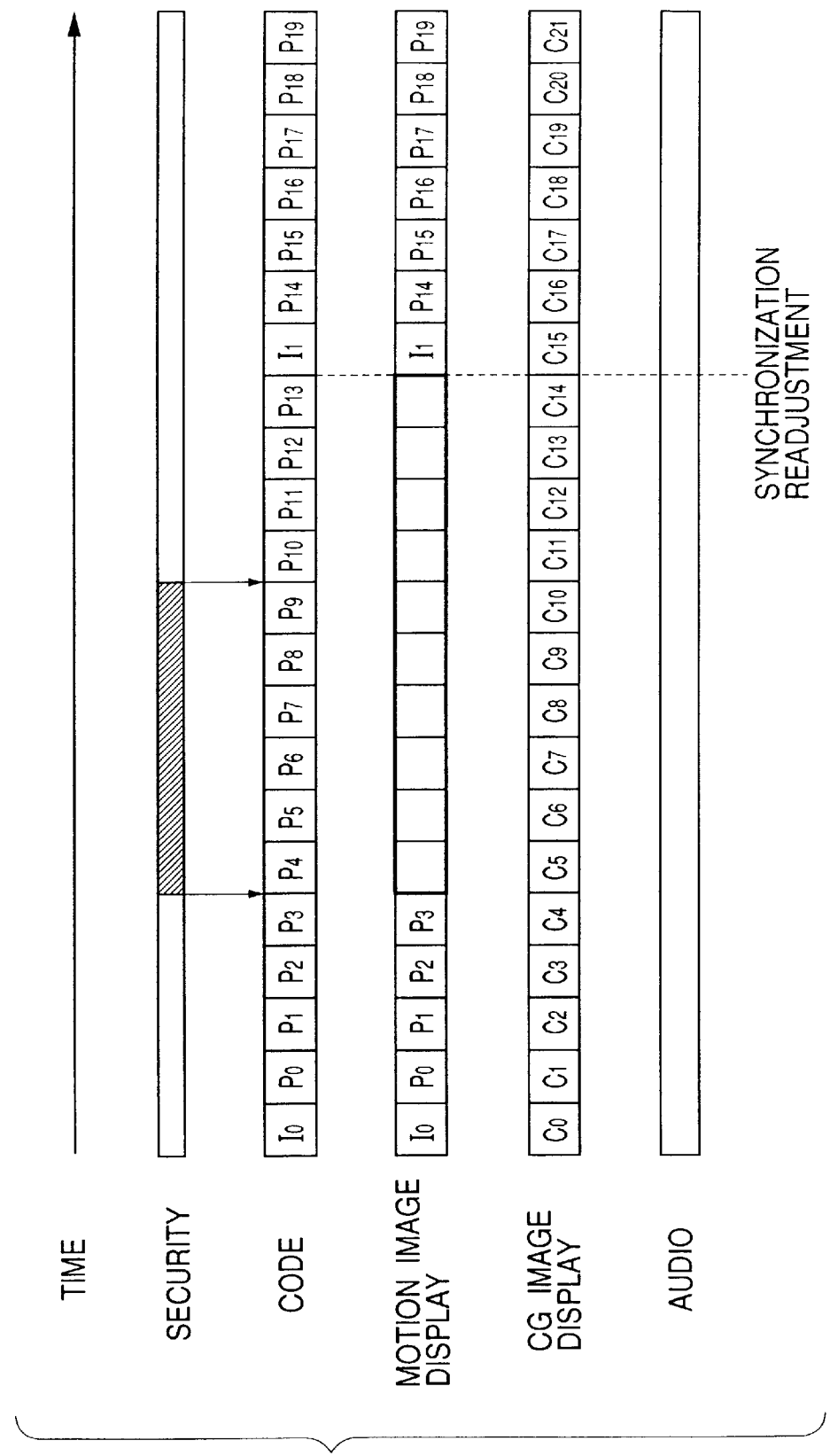
FIG. 23 is a view showing the mode of decoding in the fourth embodiment.

As an example, in case the decoding is inhibited by protection (security) of copyright in an encoding frame period $P_4$ to $P_9$ as shown in FIG. 23, the state of no display continues from the start of security. However, the audio and CG data continue to be reproduced. The decoding is re-started from the next $I_1$ frame and the synchronization is re-adjusted, whereby avoided is interruption or perturbation of the image, and the operator is relieved from the unpleasant image display.

In the present embodiment, during the period of inhibition of decoding, there is outputted the image decoded immediately before such inhibitions but it is also possible to stored a predetermined image in advance for example in a memory and to output such predetermined image.

In the present embodiment, the configuration or the memories etc. is suitably modifiable. Also similar effects can be realized for the communication data, by executing similar operations on the motion image data entered from the communication circuit 3002 through the communication interface 3003.

The detection of the frame mode may naturally be replaced by the detection of the start code for a group of pictures, and the reconstruction of synchronization with the audio signal etc. at the re-start of decoding can be easily achieved by employing the decoded result of a time_code of the group of picture layer or a temporal_reference code of the picture, instead of the vop_time_increment code.

For the purpose of brevity, the foregoing description has been made on the I and P frames, but the recovery of synchronization can naturally be achieved similarly in case of employing B frame.

Also the configuration of the security code is not limited to that explained in the foregoing. FIG. 24 shows a configuration in case plural objects are present in the MPEG-4 method. There is added an Objectcode 4030 for distinguishing each object, so that security can be applied to each object. It is therefore possible to secure the synchronization in independent decoding of plural objects, by preparing the video decoding unit 3006, shown in FIG. 15, in plural units corresponding to the number of the objects to be decoded and operating these units in parallel.

Also a configuration shown in FIG. 25 may also be adopted, and the decoding can be re-started as soon as the certification is executed.

Figure 26:
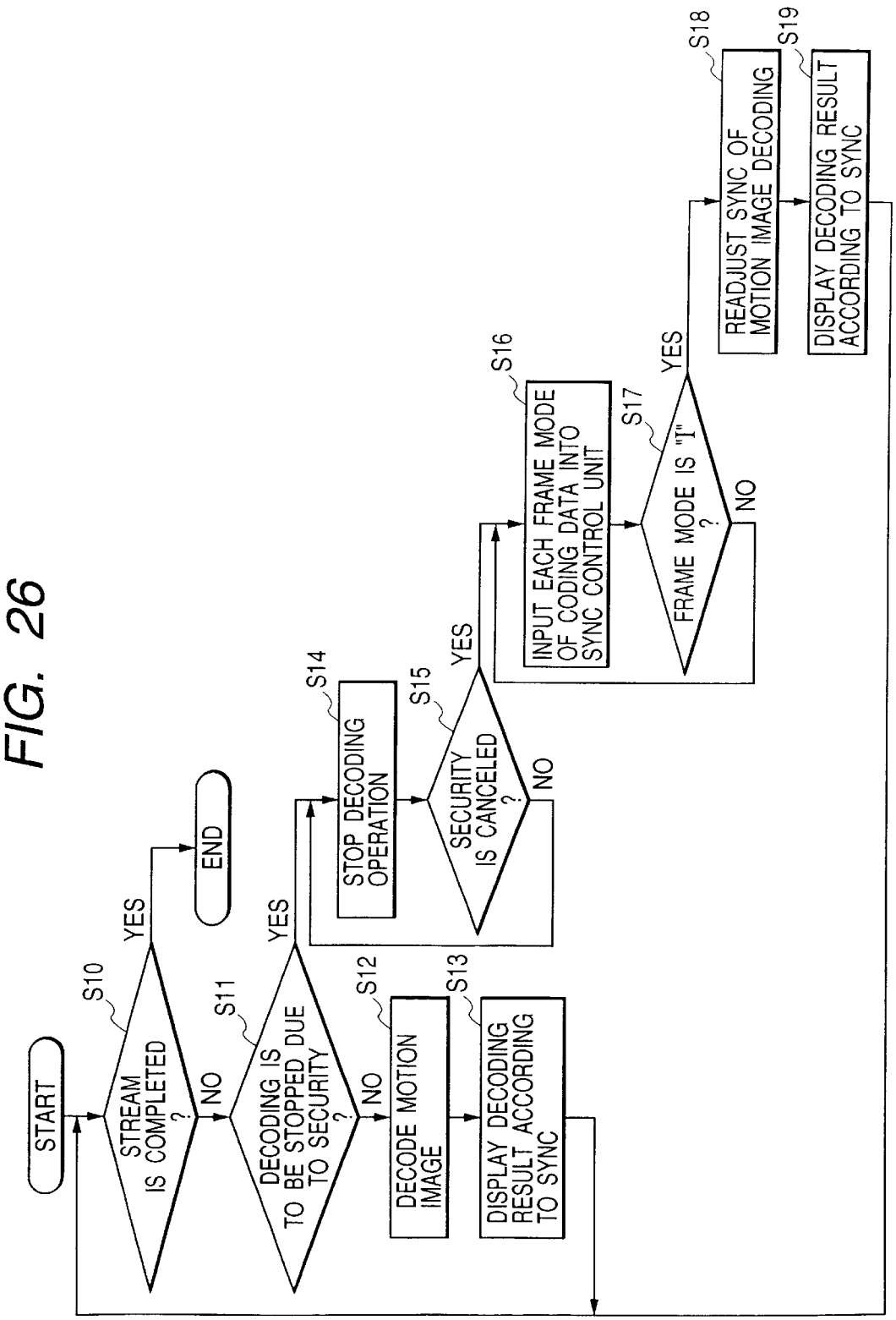
FIG. 26 is a flow chart showing the entire function of the fourth embodiment.

FIG. 26 is a flow chart showing the above-described decoding operation.

At first a step S10 discriminates whether the video encoded data are entered from the memory device 3001, and, if entered, the sequence proceeds to a step S11, but, if not, the sequence is terminated.

A step S11 discriminates whether the security decoding unit 3005 permits decoding in the above-mentioned motion image data. If the result of decoding in the security decoding unit 3005 indicates that the decoding is permitted, the sequence proceeds to a step S12, but, if inhibited, the sequence proceeds to a step S14.

A step S12 activates the video decoding unit 3006 to decode the motion image according to the MPEG-4 decoding method. A next step S13 enters the decoded image into the synchronization control unit 3008, and displays the image in synchronization on the monitor 3009, whereupon the sequence returns to the step S10.

A step S14 deactivates the video decoding unit 3006. In order to secure synchronization, the encoded data are read in synchronization even while the decoding is inhibited, but are not stored in the working area of the memory and discarded.

Then a step S15 discriminates whether the re-start of decoding is instructed from the security decoding unit 3005, and, if not, the sequence returns to the step S14, but, if instructed, the sequence proceeds to a step S16.

If the re-start of decoding is instructed from the security decoding unit 3005 (step S15), a step S16 activates the header decoder 605 of the security decoding unit 3005, thereby executing decoding up to the vop_coding_type code 4025 indicating the frame mode of each frame, and sends the result of decoding to the synchronization control unit 3008.

Then in a step S17, the synchronization control unit 3008 discriminates whether the result of decoding of the vop_coding_type code 4025 indicates an I frame. If otherwise, the sequence returns to the step S16 to decode the next vop_coding_type code 4025, but, if an I frame, the sequence proceeds to a step S18.

A step S18 re-starts the decoding after the vop_coding_type code 4025, thereby decoding the motion image according to the MPEG-4 decoding method, also decodes the vop_time_increment code thereby adjusting the synchronization of reproduction, and the sequence proceeds to a step S19.

In a step S19, the synchronization control unit 3008 displays the motion image data on the monitor 3009 in synchronization, and the sequence returns to the step S10.

Such selection procedure allows to realize all the apparatus or a part thereof by softwares. It is also rendered possible to apply security, for protecting copyright or the like, independently on the audio data and the motion image.

Figure 27:
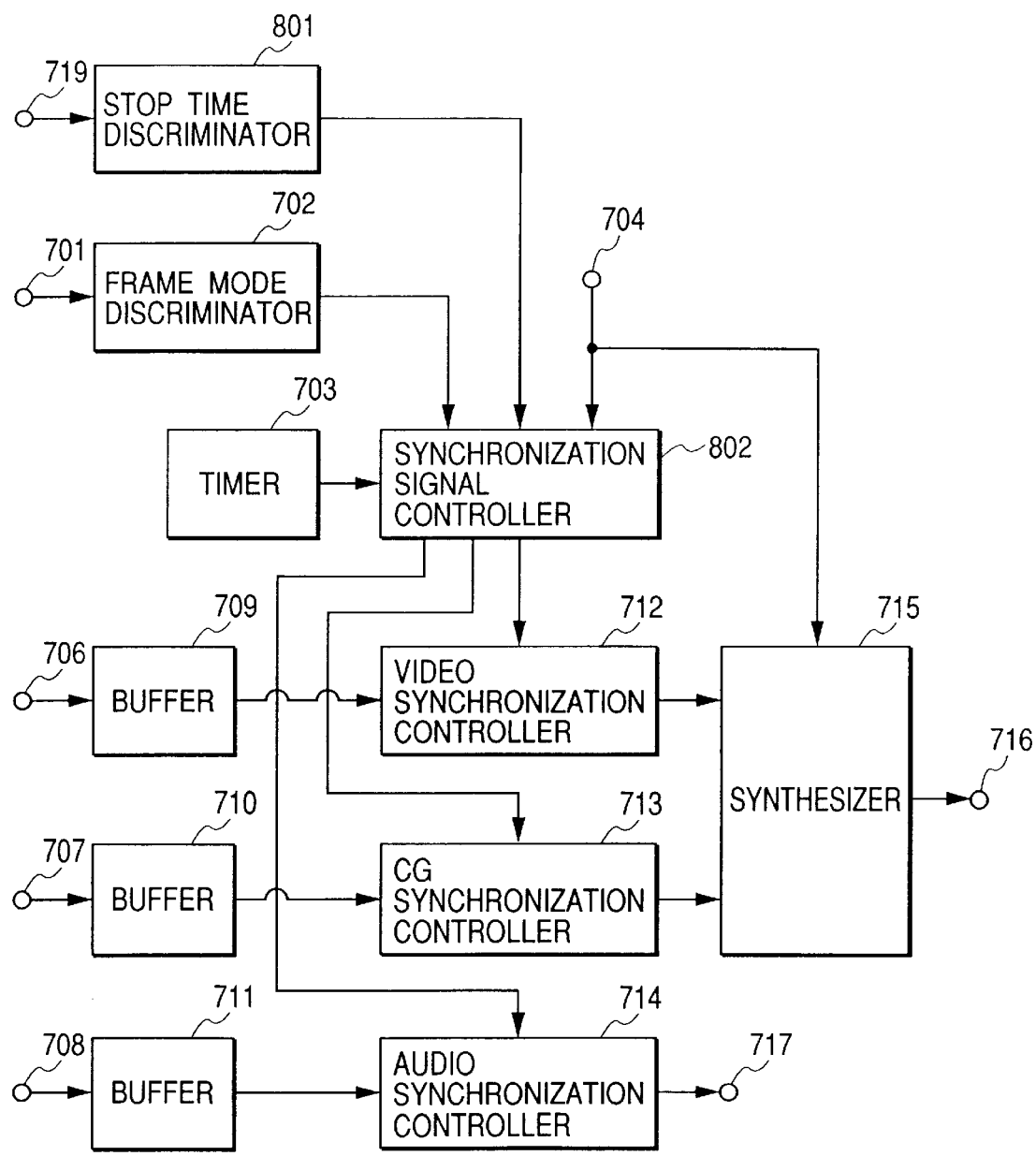
FIG. 27 is a block diagram showing another configuration of the synchronization control unit 3008 in a fifth embodiment of the present invention.

FIG. 27 is a block diagram showing the configuration of the synchronization control unit 3008 in a fifth embodiment of the present invention, wherein components equivalent to those in the fourth embodiment are represented by corresponding numbers and will not be explained further.

In FIG. 27, there are shown a stop time discriminator 801 for determining the time in which security is applied; and a synchronization signal controller 802 for controlling synchronization.

In the following there will be explained the decoding procedure in the synchronization control unit 3008 of the above-described configuration.

As in the fourth embodiment, the motion image data, CG image data and audio data are respectively stored in the buffers 709, 710, 711. The synchronization control signal controller 802 compares the timings of reproduced outputs of various data from the system decoding unit 3004 and the reproducing time of the motion image data, with the time of the timer 703 and generates signals for controlling the video synchronization controller 712, the CG synchronization controller 713 and the audio synchronization controller 714. According to these signals, the video synchronization controller 712, the CG synchronization controller 713 and the audio synchronization controller 714 read and output the data from the buffers 709, 710, 711 in synchronization.

When security is applied to the motion image and the decoding is inhibited, such status is entered into the terminal 719. The stop time discriminator 801 records the time of entry, in order to measure the stop time during which the reproduction is stopped by security, informs the synchronization signal controller 802 of the interruption of decoding, and instructs the video synchronization controller 712 to interrupt synchronization on the motion image data. The video synchronization controller 712 terminates the display of the motion image data, whereby the CG image data alone are outputted through the synthesizer 715 to the terminal 716.

When the security on the motion image is relieved and the decoding is re-started, such status is entered from the terminal 719. The stop time discriminator 801 determines the stop time during which the reproduction is stopped by security, from the time of inhibition of decoding. This time and the re-start of decoding are informed to the synchronization signal controller 802. However the synchronization signal controller 802 does not immediately activate the video synchronization controller 712, but enters the encoding mode of each frame from the terminal 701 and discriminates the frame mode. Such state is retained until an I frame mode is entered. When an I frame is entered, the reproduction time is calculated from the stop time and the decoded result of the vop_time_increment code 4026 of the frame and is compared with time of the timer 703. Then there is given an instruction to activate the video synchronization controller 712 from the encoded data of the I frame, and the motion image data of the I frame are read from the buffer 709 and supplied to the synthesizer 715.

Such selection procedure in case of re-starting the decoding allows to restore the synchronization by referring to the stop time and to start the process from the frame of intraframe encoding, and the synchronization can be securely restored even after the stopping of a long period that cannot be represented by the decoded result of the vop_time_increment code. The decoded result of the vop_time_increment code can only described the time up to 256 frames, but the synchronization can be calculated from the stop time in cooperation with the decoded result of the vop_time_increment code 4026.

The present invention may also be applied to a system consisting of plural equipment (for example host computer, interface devices, reader, printer etc.) or an apparatus consisting of a single equipment (such as a copying machine or a facsimile apparatus).

Also the present invention includes a case where the program codes of a software realizing the aforementioned embodiments are supplied to a computer of a system or an apparatus connected to various devices in order to operate the devices so as to realize the functions of the foregoing embodiments and the functions of the aforementioned embodiments are realized by operating the devices by the computer (CPU or MPU) of the above-mentioned system or apparatus according to the program codes.

In such case the program codes themselves of the software realize the functions of the aforementioned embodiments, and the program codes themselves and the memory medium storing the program codes constitutes the present invention.

The memory medium storing such program codes can be, for example, a floppy disk, a hard disk, an optical disk, a magnetooptical disk, a CD-ROM, a magnetic tape, a nonvolatile memory card or a ROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

In the foregoing description, the decoding is started in the unit of a frame, but such case is not restrictive and the decoding may also be started in the unit of a field or plural macroblocks.

The format of the security encoded data, the certification method, the method of designating the portion for protecting the copyright etc. are not limited to those in the foregoing embodiments but may naturally be replaced by other formats or other certification methods.

Also in the foregoing embodiments, the period of security is determined in advance, but such form is not restrictive. For example the user may determine the timing of releasing the security for example by entering a password for releasing the security, and releasing the security after the password is certified.

In other words, the foregoing description of embodiment has been given for illustrative purposes only and not be construed as imposing any limitation in every respect.

The scope of the invention is, therefore, to be determined solely by the following claims and not limited by the text of the specifications and alterations made with a scope equivalent to the scope of the claims fall within the true spirit and scope of the invention.

What is claimed is:

1. An image processing apparatus comprising:
   a) input means for inputting image data encoded with plural encoding modes and security data for protecting the image data, the security data including at least information for authentication and information indicative of an image protecting period;
   b) discrimination means for discriminating, based on the security data, whether reproduction of the encoded image data is permitted or not;
   c) encoding mode judging means for judging the encoding mode of the encoded image data;
   d) decoding means for decoding the encoded image data and outputting the decoded image data; and
   e) control means for controlling the decoding operation of said decoding means according to the outputs of said discrimination means and said encoding mode judging means.

2. An apparatus according to claim 1, wherein the plural encoding modes at least include an intra-encoding mode and an inter-encoding mode.

3. An apparatus according to claim 2, wherein the plural encoding modes include a bidirectional prediction encoding mode.

4. An apparatus according to claim 1, wherein said control means is adapted to stop the decoding operation of said decoding means.

5. An apparatus according to claim 4, wherein said control means is adapted to re-start the decoding operation of said decoding means.

6. An apparatus according to claim 2, wherein said control means is adapted, in a case in which the reproduction is permitted by said discrimination means from a state in which the reproduction is inhibited, to stop the decoding operation to the intra-encoded image data after the reproduction is permitted.

7. An apparatus according to claim 2, wherein said control means is adapted, in a case in which the reproduction is permitted by said discrimination means from a state in which the reproduction is inhibited, to re-start the decoding operation from the intra-encoded image data after the reproduction is permitted.

8. An apparatus according to claim 1, wherein said control means is adapted, in a case in which the reproduction is inhibited by said discrimination means, to output the image data decoded before the reproduction is inhibited.

9. An apparatus according to claim 1, wherein said control means is adapted, in a case in which the reproduction is inhibited by said discrimination means, to output a predetermined image at least during the period in which the reproduction is inhibited.

10. An apparatus according to claim 1, wherein the image data is motion image data.

11. An apparatus according to claim 10, wherein the encoded image data is data encoded according to MPEG-1.

12. An apparatus according to claim 10, wherein the encoded image data is data encoded according to MPEG-2.

13. An apparatus according to claim 10, wherein the encoded image data is data encoded according to MPEG-4.

14. An apparatus according to claim 1, wherein the encoded image data is data obtained by dividing an image into N objects (N being a natural number), and encoding each of the objects.

15. An apparatus according to claim 14, wherein said decoding means executes decoding for each of the objects.

16. An apparatus according to claim 15, wherein said control means controls the decoding process in the unit of each of the objects.

17. An apparatus according to claim 14, wherein the security data at least include a code for identifying the object.

18. An apparatus according to claim 1, wherein the security data at least include a code for protecting intellectual property rights.

19. An apparatus according to claim 1, wherein the security data at least include a code for copyright certification.

20. An apparatus according to claim 1, wherein the encoded image data includes a code for identifying the encoding mode, and said encoding mode judging means judges the encoding mode by the code.

21. An image processing apparatus comprising:
   a) input means for inputting image data encoded with plural encoding modes and security data for protecting the image data, the security data including at least information for authentication and information indicative of an image protecting period;
   b) discrimination means for discriminating, based on the security data, whether the reproduction of the encoded image data is permitted or not;
   c) encoding mode judging means for judging the encoding mode of the encoded image data;
   d) image decoding means for decoding the encoded image data; and
   e) synchronization control means for controlling the synchronization of the decoded image data according to the outputs of said discrimination means and said encoding mode judging means.

22. An apparatus according to claim 21, wherein said input means includes decoding means for entering encoded information data and decoding said information data, and said synchronization control means is adapted to control synchronization of the decoded image data and the decoded information data.

23. An apparatus according to claim 21, wherein said image decoding means is adapted to control the decoding operation according to the outputs of said discrimination means and said encoding mode judging means.

24. An apparatus according to claim 21, wherein the plural encoding modes at least include an intra-encoding mode and an inter-encoding mode.

25. An apparatus according to claim 21, wherein said image decoding means is adapted to stop the decoding operation according to the output of said discrimination means.

26. An apparatus according to claim 25, wherein said image decoding means is adapted to re-start the decoding operation according to the outputs of said discrimination means and said encoding mode judging means.

27. An apparatus according to claim 24, wherein said synchronization control means is adapted, in a case in which the reproduction is permitted by said discrimination means from a state in which the reproduction is inhibited, to re-start synchronization according to the intra-encoded image data after the reproduction is permitted.

28. An apparatus according to claim 21, wherein said synchronization control means is adapted, in a case in which the reproduction is permitted by said discrimination means from a state in which the reproduction is inhibited, to re-start synchronization according to the period in which the reproduction is inhibited.

29. An apparatus according to claim 21, wherein the image data is motion image data.

30. An apparatus according to claim 21, wherein the encoded image data is data encoded according to MPEG-1.

31. An apparatus according to claim 21, wherein the encoded image data is data encoded according to MPEG-2.

32. An apparatus according to claim 21, wherein the encoded image data is data encoded according to MPEG-4.

33. An apparatus according to claim 21, wherein the encoded image data is data obtained by dividing an image into N objects, N being a natural number, and encoding each of the objects.

34. An apparatus according to claim 33, wherein said image decoding means executes decoding for each of the objects.

35. An apparatus according to claim 33, wherein the security data at least include a code for identifying the object.

36. An apparatus according to claim 21, wherein the security data at least includes a code for protecting intellectual property rights.

37. An apparatus according to claim 21, wherein the security data at least includes a code for copyright certification.

38. An apparatus according to claim 21, wherein the encoded image data includes a code for identifying the encoding mode, and said encoding mode judging means judges the encoding mode by the code.

39. An apparatus according to claim 22, wherein the information data is audio data.

40. An image processing method comprising the steps of:
inputting image data encoded with plural encoding modes and security data for protecting the image data, the security data including at least information for authentication and information indicative of an image protecting period;
discriminating, based on the security data, whether reproduction of the encoded image data is permitted or not;
judging the encoding mode of the encoded image data; and
decoding the encoded image data according to the result of said discrimination and the result of the judgment.

41. An image processing method comprising the steps of:
inputting image data encoded with plural encoding modes and security data for protecting the image data, the security data including at least information for authentication and information indicative of an image protecting period;
discriminating, based on the security data, whether reproduction of the encoded image data is permitted or not;
judging the encoding mode of the encoded image data;
decoding the encoded image data; and
controlling the synchronization of the decoded image data according to the results of said discrimination and the encoding mode judgment.

42. A computer readable recording medium for recording a program for causing a computer to execute an image processing method, said method comprising:
a) an input step, of inputting image data encoded with plural encoding modes and security data for protecting the image data, the security data including at least information for authentication and information indicative of an image protecting period;
b) a discrimination step, of discriminating, based on the security data, whether reproduction of encoded image data is permitted or not;
c) an encoding mode judging step, of judging the encoding mode of the encoded image data; and
d) a decoding step, of decoding the encoded image data according to the results of said discrimination step and said encoding mode judging step.

43. A computer readable recording medium for recording a program for causing a computer to execute an image processing method, said method comprising:
a) an input step, of inputting image data encoded with plural encoding modes and security data for protecting the image data, the security data including at least information for authentication and information indicative of an image protecting period;
b) a discrimination step, of discriminating, based on the security data, whether the reproduction of the encoded image data is permitted or not;
c) an encoding mode judging step, of judging the encoding mode of the encoded image data;
d) an image decoding step, of decoding the encoded image data; and
e) a synchronization control step, of controlling the synchronization of the decoded image data according to the results of said discrimination step and said encoding mode judging step.

44. An image processing apparatus comprising:
a) input means for entering image data encoded with plural encoding modes and security data for protecting the image data;
b) discrimination means for discriminating, based on the security data, whether reproduction of the encoded image data is permitted or not;
c) encoding mode judging means for judging the encoding mode of the encoded image data;
d) decoding means for decoding the encoded image data and outputting the decoded image data; and
e) control means for controlling the decoding operation of said decoding means according to the outputs of said discrimination means and said encoding mode judging means.

45. An apparatus according to claim 44, wherein the plural encoding modes at least include an inter-encoding mode and an inter-encoding mode.

46. An apparatus according to claim 45, wherein the plural encoding modes include a bidirectional prediction encoding mode.

47. An apparatus according to claim 44, wherein said control means is adapted to stop the decoding operation of said decoding means.

48. An apparatus according to claim 47, wherein said control means is adapted to re-start the decoding operation of said decoding means.

49. An apparatus according to claim 45, wherein said control means is adapted, in a case in which the reproduction is permitted by said discrimination means from a state in which the reproduction is inhibited, to stop the decoding operation to the intra-encoded image data after the reproduction is permitted.

50. An apparatus according to claim 45, wherein said control means is adapted, in a case in which the reproduction is permitted by said discrimination means from a state in which the reproduction is inhibited, to re-start the decoding operation from the intra-encoded image data after the reproduction is permitted.

51. An apparatus according to claim 44, wherein said control means is adapted, in a case in which the reproduction is inhibited by said discrimination means, to output the image data decoded before the reproduction is inhibited.

52. An apparatus according to claim 44, wherein said control means is adapted, in a case in which the reproduction is inhibited by said discrimination means, to output a predetermined image at least during the period in which the reproduction is inhibited.

53. An image processing method comprising the steps of:

entering image data encoded with plural encoding modes and security data for protecting the image data;

discriminating, based on the security data, whether reproduction of the encoded image data is permitted or not;

judging the encoding mode of the encoded image data; and decoding the encoded image data according to a result of said discriminating step and a result of said judging step.

54. A computer readable recording medium for recording an image processing program, said program comprising:

a) process code of an input step, of entering image data encoded with plural encoding modes and security data for protecting the image data;

b) process code of a discrimination step, of discriminating, based on the security data, whether reproduction of the encoded image data is permitted or not;

c) process code of an encoding mode judging step, of judging the encoding mode of the encoded image data;

d) process code of a decoding step, of decoding the encoded image data and outputting the decoded image data; and e) process code of a decoding step, of controlling the decoding of the encoded image data according to results of said discrimination step and said encoding mode judging step.

* * * * *

UNITED STATES PATENT AND TRADEMARK OFFICE
CERTIFICATE OF CORRECTION

PATENT NO. : 6,763,071 B1
APPLICATION NO. : 09/452185
DATED : July 13, 2004
INVENTOR(S) : Mitsuru Maeda et al.

It is certified that error appears in the above-identified patent and that said Letters Patent is hereby corrected as shown below:

COLUMN 4

Line 43, "on" should read --of--.

COLUMN 5

Line 52, "according" should read --according to--.

COLUMN 7

Line 16, "control" should read --controls--;
Line 30, "discard" should read --discards--;
Line 40, "these" should read --this--; and
Line 46, "these" should read --this--.

COLUMN 8

Line 51, "stored" should read --store--.

COLUMN 9

Line 29, "these" should read --this--.

COLUMN 10

Line 60, "stored" should read --store--.

COLUMN 13

Line 22, "visual object" should read --visual_object--.

COLUMN 14

Line 14, "are" should read --is--.

COLUMN 17

Line 52, "these" should read --this--.

UNITED STATES PATENT AND TRADEMARK OFFICE
CERTIFICATE OF CORRECTION

PATENT NO. : 6,763,071 B1
APPLICATION NO. : 09/452185
DATED : July 13, 2004
INVENTOR(S) : Mitsuru Maeda et al.

It is certified that error appears in the above-identified patent and that said Letters Patent is hereby corrected as shown below:

COLUMN 20

Line 9, "inhibitions" should read --inhibition,-- and "stored" should read --store--.

COLUMN 22

Line 27, "only described" should read --only be described as--.

COLUMN 23

Line 11, "etc." should read --etc.,--;
Line 20, "embodiment" should read --embodiments--; and
Line 21, "not" should read --is not to--.

COLUMN 26

Line 42, "whether the" should read --whether--.

COLUMN 27

Line 2, "inter-encoding" should read --intra-encoding--.

Signed and Sealed this

Twenty-ninth Day of July, 2008

JON W. DUDAS
*Director of the United States Patent and Trademark Office*